US009155967B2

(12) United States Patent
Koganezawa et al.

(10) Patent No.: US 9,155,967 B2
(45) Date of Patent: Oct. 13, 2015

(54) METHOD FOR IMPLEMENTING GAME, STORAGE MEDIUM, GAME DEVICE, AND COMPUTER

(75) Inventors: Tsutomu Koganezawa, Urayasu (JP); Shinichiro Umetani, Tokyo (JP)

(73) Assignee: BANDAI NAMCO GAMES INC., Tokyo (JP)

( * ) Notice: Subject to any disclaimer, the term of this patent is extended or adjusted under 35 U.S.C. 154(b) by 0 days.

(21) Appl. No.: 14/345,123

(22) PCT Filed: Aug. 31, 2012

(86) PCT No.: PCT/JP2012/072141
§ 371 (c)(1),
(2), (4) Date: Mar. 14, 2014

(87) PCT Pub. No.: WO2013/038923
PCT Pub. Date: Mar. 21, 2013

(65) Prior Publication Data
US 2014/0357366 A1 Dec. 4, 2014

(30) Foreign Application Priority Data
Sep. 14, 2011 (JP) ................................ 2011-200816

(51) Int. Cl.
*A63F 9/24* (2006.01)
*A63F 13/53* (2014.01)
*G06T 19/00* (2011.01)
(Continued)

(52) U.S. Cl.
CPC ............... *A63F 13/53* (2014.09); *A63F 13/213* (2014.09); *A63F 13/327* (2014.09); *A63F 13/34* (2014.09); *A63F 13/5255* (2014.09);
(Continued)

(58) Field of Classification Search
CPC .................................. A63F 13/10; A63F 13/12
USPC ....................................................... 463/42, 31
See application file for complete search history.

(56) References Cited

U.S. PATENT DOCUMENTS 7,289,130 B1    10/2007  Satoh et al.
2003/0062675 A1  4/2003  Noro et al.
(Continued)

FOREIGN PATENT DOCUMENTS

JP    A 9-50540      2/1997
JP    A 2001-195601  7/2001
(Continued)

OTHER PUBLICATIONS

Dec. 4, 2012 Search Report issued in International Patent Application No. PCT/JP2012/072141 (with translation).
(Continued)

*Primary Examiner* — Omkar Deodhar
(74) *Attorney, Agent, or Firm* — Oliff PLC

(57) ABSTRACT

A technique is disclosed that makes it possible to prevent or suppress various problems that may occur due to character placement control when implementing a multi-player game that utilizes an augmented reality space. A basic area is set based on the relative position of each game device with respect to an AR marker, and an element area is set so that the AR marker does not lie outside the imaging range of a CCD camera module of each game device. An overlapping area of the basic area and the element area is calculated to be a placement area. The motion of an attention object is controlled so that the attention object remains within the placement area.

17 Claims, 29 Drawing Sheets

(51) Int. Cl.
*A63F 13/65* (2014.01)
*A63F 13/213* (2014.01)
*A63F 13/5255* (2014.01)
*A63F 13/34* (2014.01)
*A63F 13/92* (2014.01)
*A63F 13/327* (2014.01)
*A63F 13/5258* (2014.01)

(52) U.S. Cl.
CPC ............... *A63F 13/65* (2014.09); *A63F 13/92* (2014.09); *G06T 19/006* (2013.01); *A63F 13/5258* (2014.09)

(56) References Cited

U.S. PATENT DOCUMENTS

| | | | |
|---|---|---|---|
| 2006/0071946 | A1 | 4/2006 | Anabuki et al. |
| 2008/0100620 | A1 | 5/2008 | Nagai et al. |
| 2010/0045869 | A1 | 2/2010 | Baseley et al. |
| 2010/0203933 | A1* | 8/2010 | Eyzaguirre et al. ............... 463/2 |

FOREIGN PATENT DOCUMENTS

| | | |
|---|---|---|
| JP | A 2003-103052 | 4/2003 |
| JP | A 2004-234253 | 8/2004 |
| JP | A 2005-165614 | 6/2005 |
| JP | A 2006-72668 | 3/2006 |
| JP | A 2006-127468 | 5/2006 |
| JP | A 2010-49690 | 3/2010 |
| JP | A 2011-62390 | 3/2011 |
| WO | 2011109126 A1 | 9/2011 |

OTHER PUBLICATIONS

May 22, 2015 Search Report issued in European Patent Application No. 12 83 1209.

Reitmayr G. et al., "Mobile collaborative augmented reality," Augmented Reality, 2001 Proceedings, IEEE and ACM International Symposium on New York, NY USA, Oct. 29-30, 2001, IEEE Comput. Soc., US, Oct. 29, 2001, pp. 114-123.

Wagner, Daniel, "Handlheld Augmented Reality" in: "Handheld Augmented Reality," Oct. 1, 2007.

* cited by examiner

FIG. 1
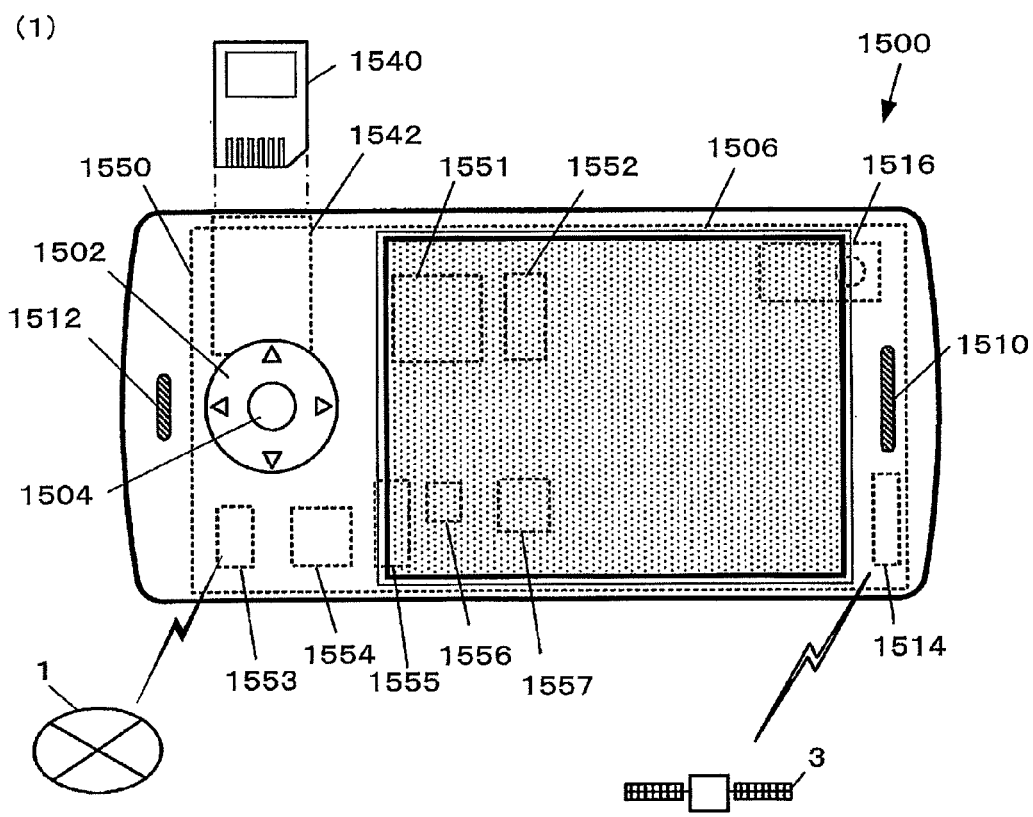
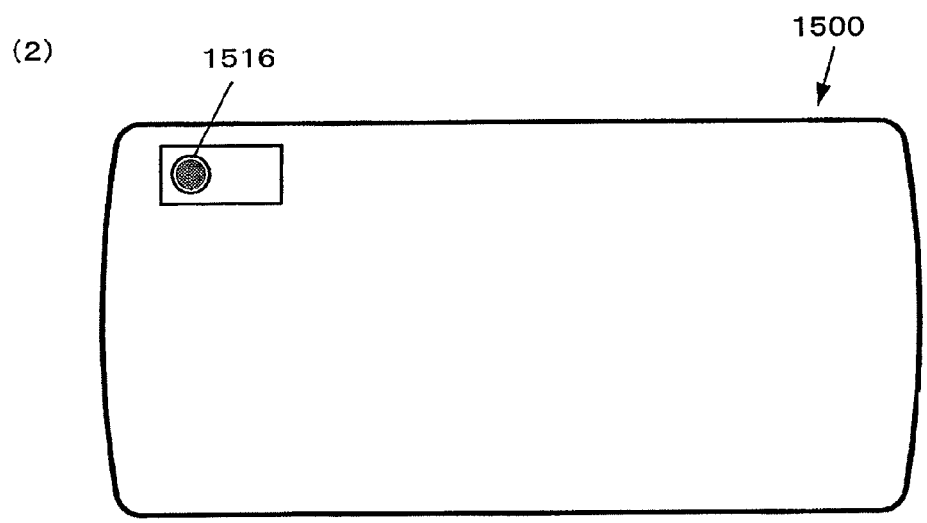

FIG. 2
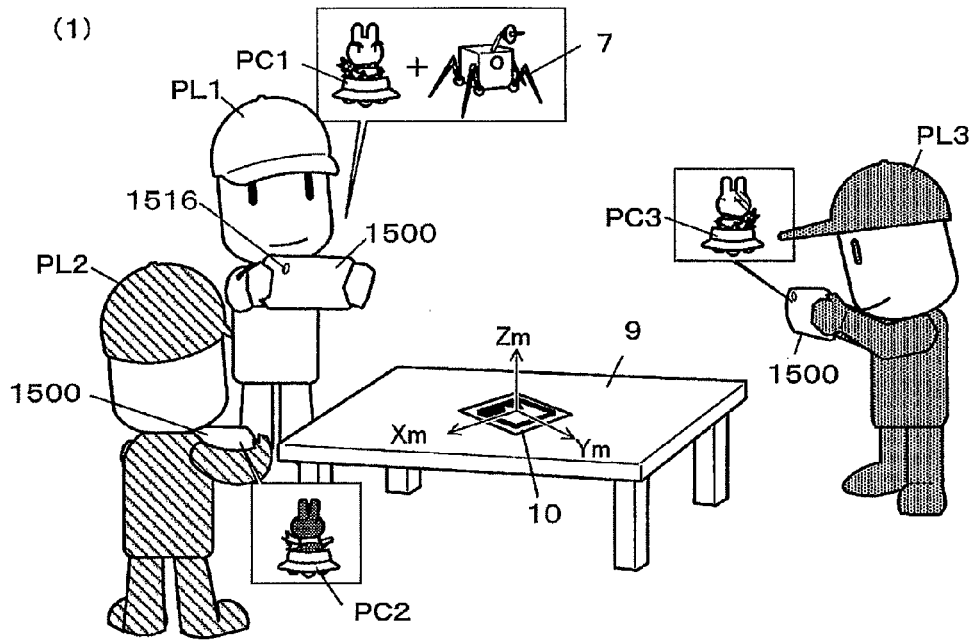
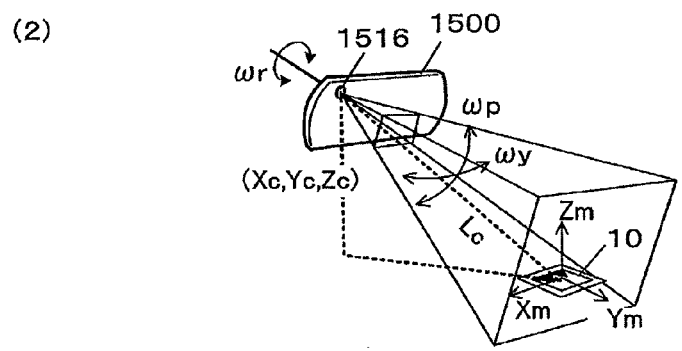
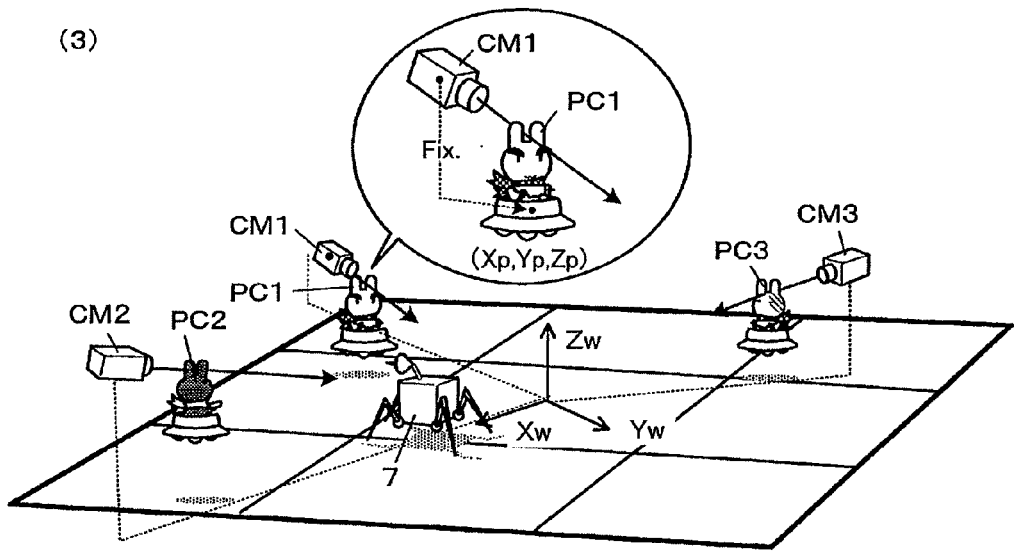

FIG. 3
(1)
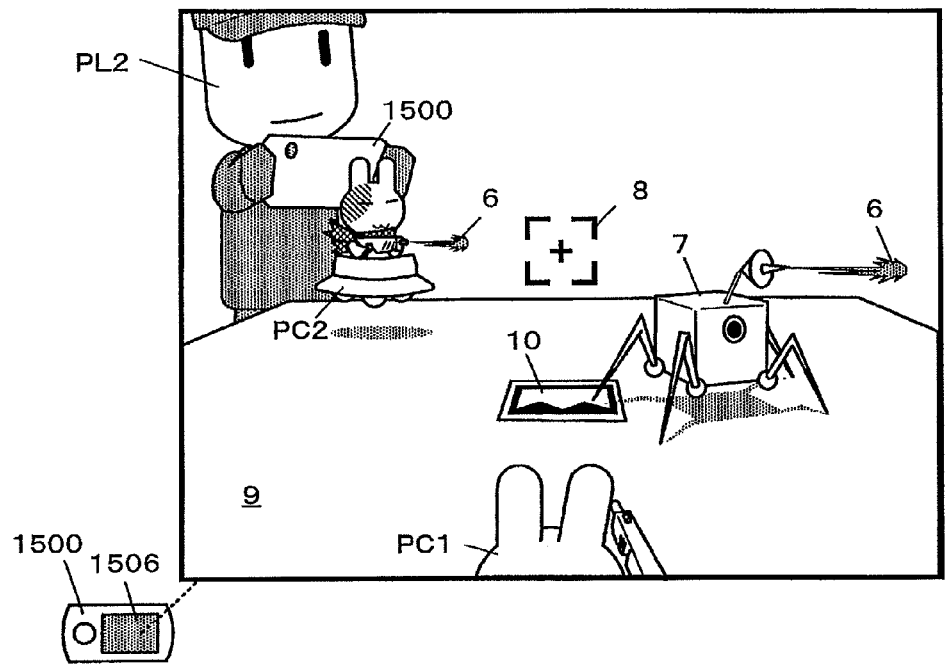
(2)
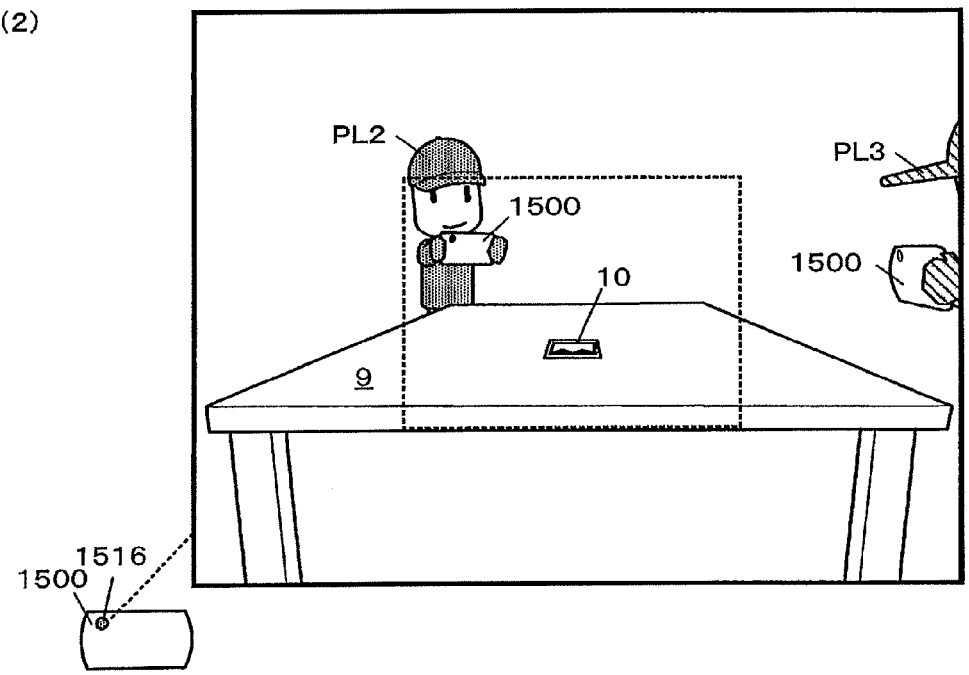

FIG. 6
(1)
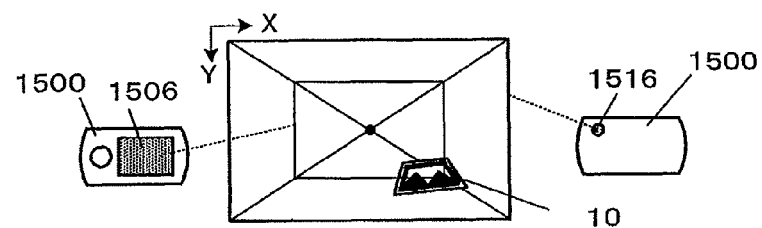
(2) [FIRST POSTURE] [SECOND POSTURE]
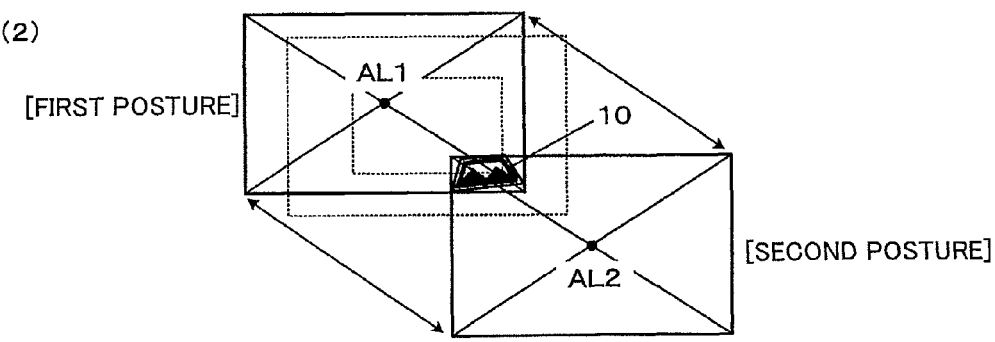
(3) [THIRD POSTURE] [FOURTH POSTURE]
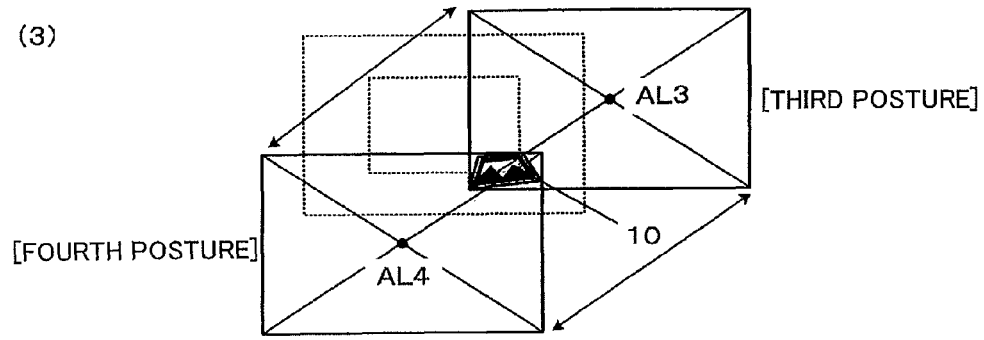
(4)
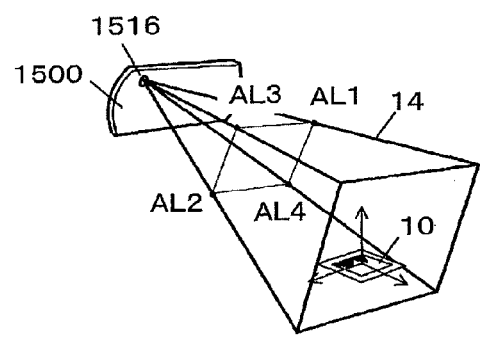

FIG. 7
(1)
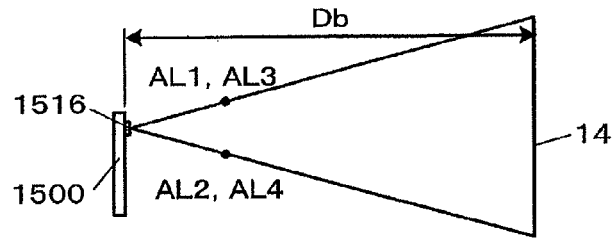
(2)
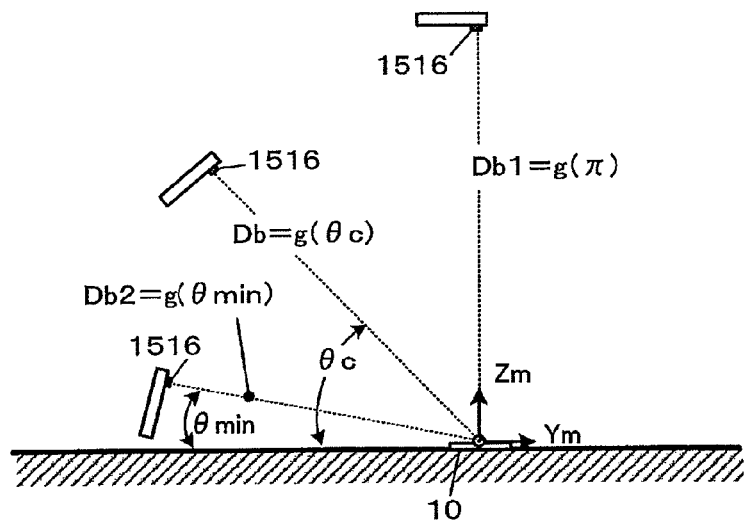
(3)
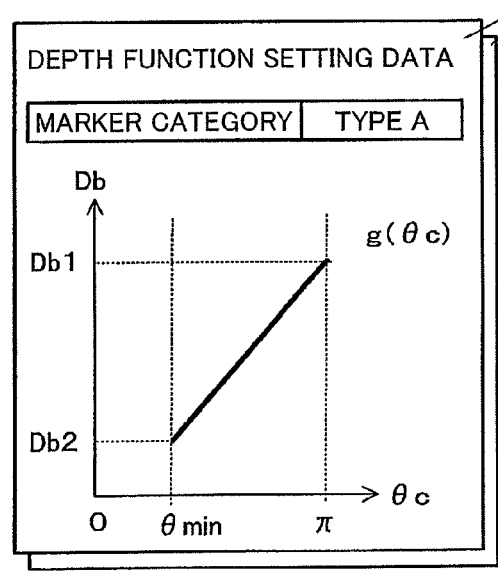

FIG. 9
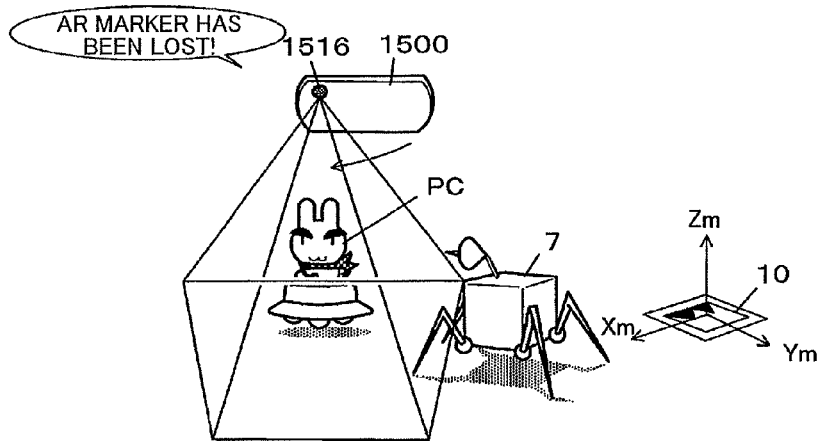
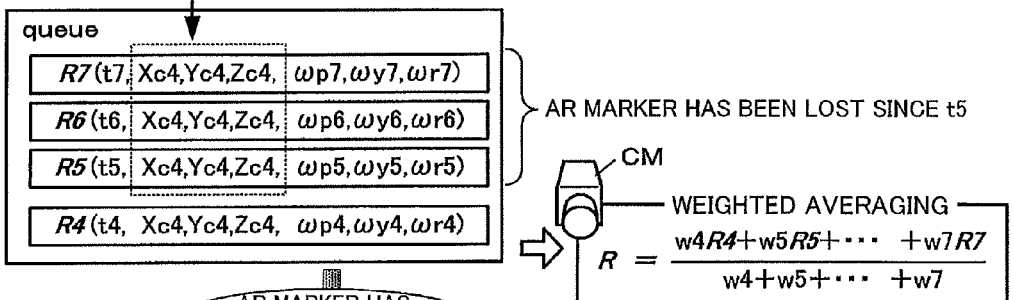
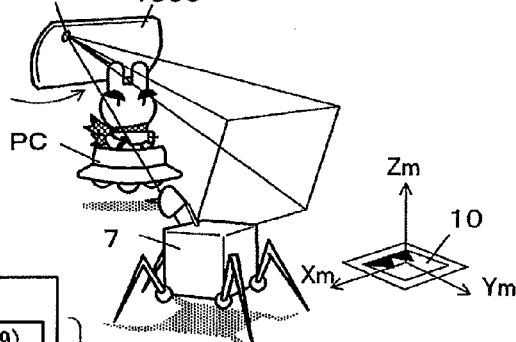

FIG. 10

| | 1500a | MARKER RECOGNITION STATE | CONTROL TARGET | | | |
|---|---|---|---|---|---|---|
| (1) INITIAL HOST | [1] | In Sight | PC1 | + 7 | + AREA SETTING | FUNCTION AS HOST |
| 1500b | [2] | In Sight | PC2 | | | |
| 1500c | [3] | In Sight | PC3 | | | |

| | 1500a | MARKER RECOGNITION STATE | CONTROL TARGET | | | |
|---|---|---|---|---|---|---|
| (2) INITIAL HOST LOST SIGNAL | [1] | LOST | PC1 | | | |
| 1500b | [2] | In Sight | PC2 | + 7 | + AREA SETTING | FUNCTION AS HOST |
| 1500c | [3] | In Sight | PC3 | | | |

| | 1500a | MARKER RECOGNITION STATE | CONTROL TARGET | | | |
|---|---|---|---|---|---|---|
| (3) INITIAL HOST LOST SIGNAL | [1] | LOST | PC1 | | | |
| 1500b | [2] | LOST | PC2 | | | |
| 1500c | [3] | In Sight | PC3 | + 7 | + AREA SETTING | FUNCTION AS HOST |

| 520 | GAME-PARTICIPATING DEVICE REGISTRATION DATA | | | |
|---|---|---|---|---|
| 521 | GAME DEVICE ID | G01 | G02 | ... |
| 522 | ADDRESS INFORMATION | IP01, PORT 01 | IP02, PORT 02 | ... |
| 523 | HOST PRIORITY | 1 | 2 | ... |
| 524 | PLAYER CHARACTER TYPE | PC1 | PC2 | ... |
| 525 | MARKER RECOGNITION STATE | 1 (In Sight) | 0 (LOST) | ... |
| 526 | HOST FUNCTION FLAG | 1 (HOST) | 0 (GUEST) | ... |

FIG. 15

| | | | |
|---|---|---|---|
| 530 — INFORMATION QUEUE | | | |
| 532 — CALCULATION TIME | t1 | t2 | ... |
| 533 — RELATIVE POSITION | (Xc1,Yc1,Zc1) | (Xc2,Yc2,Zc2) | ... |
| 534 — RELATIVE POSTURE | ($\omega$p1,$\omega$y1,$\omega$r1) | ($\omega$p2,$\omega$y2,$\omega$r2) | ... |
| 535 — RELATIVE DISTANCE | Lc1 | Lc2 | ... |
| ⋮ | ⋮ | ⋮ | ⋮ |

FIG. 16

| | | | |
|---|---|---|---|
| 544 — ENEMY CHARACTER PLACEMENT INFORMATION QUEUE | | | |
| CALCULATION TIME | t1 | t2 | ... |
| POSITION COORDINATES | (Xe1,Ye1,Ze1) | (Xe2,Ye2,Ze2) | ... |
| POSTURE INFORMATION | Ve1 | Ve2 | ... |
| ⋮ | ⋮ | ⋮ | ⋮ |

FIG. 28

| 520B | TERMINAL REGISTRATION DATA | | | |
|---|---|---|---|---|
| 521B | TERMINAL ID | TERMINAL 03 | TERMINAL 04 | ... |
| 522 | ADDRESS INFORMATION | IP03, PORT 03 | IP04, PORT 04 | ... |
| 523B | REFERENCE VIEWPOINT PRIORITY | 1 | 2 | ... |
| 524 | PLAYER CHARACTER TYPE | PC3 | PC4 | ... |
| 525 | MARKER RECOGNITION STATE | 1 (In Sight) | 0 (LOST) | ... |
| 527 | REFERENCE VIEWPOINT FLAG | 1 (REFERENCE VIEWPOINT) | 0 | ... |

FIG. 29

| 530B | TERMINAL INFORMATION QUEUE | | | |
|---|---|---|---|---|
| 532 | CALCULATION TIME | t11 | t12 | ... |
| 533 | RELATIVE POSITION | (Xc11,Yc11,Zc11) | (Xc12,Yc12,Zc12) | ... |
| 534 | RELATIVE POSTURE | ($\omega$p11,$\omega$y11,$\omega$r11) | ($\omega$p12,$\omega$y12,$\omega$r12) | ... |
| 535 | RELATIVE DISTANCE | Lc11 | Lc12 | ... |
| | ⋮ | ⋮ | ⋮ | ⋮ |

| 537B | TERMINAL CURRENT POSITION |
|---|---|
| 538B | TERMINAL CURRENT POSTURE |

METHOD FOR IMPLEMENTING GAME, STORAGE MEDIUM, GAME DEVICE, AND COMPUTER

TECHNICAL FIELD

The present invention relates to a method for implementing a game that utilizes augmented reality (AR) technology, and the like.

BACKGROUND ART

An AR technique has been known that analyzes an image captured by a video camera, performs a real space-computer graphics (CG) space coordinate matching (alignment) process, and blends a CG image with the image (live view image) captured by the video camera to display an AR space.

In recent years, a video game that utilizes AR technology has been developed. A key point when implementing a game that utilizes AR technology is to appropriately match (align) a CG space (in which a game character (object) is disposed) with a real space that is captured by a camera. A technique has been known that analyzes an image of an augmented reality marker (AR marker) captured using a camera set at a fixed position, and generates a virtual map so as to match with the real plane in which the AR marker is disposed (see Patent Document 1, for example).

RELATED-ART DOCUMENT

Patent Document

Patent Document 1: JP-A-2010-49690

SUMMARY OF THE INVENTION

Technical Problem

A multi-player game has been popular as much as a single-player game. When the camera that captures the AR marker is limited (see Patent Document 1), the relative positional relationship is fixed, and the coordinates of the real space and the coordinates of the CG space can be matched in a fixed manner. Therefore, it is possible to proceed with the game without problem irrespective of the number of players. However, a problem may occur when a camera is provided to each player (e.g., when each player holds a portable game device provided with a CCD camera module), and each player plays an AR game from a different viewpoint position.

For example, a problem may occur when a common AR display object (e.g., game character) is disposed in the AR space even if the viewpoint of each player can move with respect to the AR marker. Specific examples of such a game include a game in which the players attack a common enemy character in cooperation, a virtual pet breeding game in which each player enjoys the game from his own viewpoint, and the like.

When implementing a game in which a common character appears so that placement of a character is controlled based only on the relative positional relationship between the viewpoint of a player A and the marker, no problem occurs within a game screen (AR space image) based on the viewpoint of the player A, but the common character may be displayed behind a person or the like (i.e., occlusion may occur) within a game screen based on the viewpoint of a player B and a game screen based on the viewpoint of a player C.

When the player A has changed the direction of the camera in order to focus on the common character, and the marker has been situated outside the imaging range of the camera, a mismatch may occur between the coordinates of the real space and the coordinates of the CG space. In this case, even if the marker is captured by the camera of the player B and the camera of the player C, a shift in display position may occur within the game screen provided to the player B and the game screen provided the player C.

In summary, it has been desired to improve the quality of a multi-player game that utilizes an augmented reality space. It has also been desired to prevent various problems that may occur due to character placement control.

Solution to Problem

According to one aspect of the invention, there is provided a program that causes a computer that includes an imaging section, a display section, and a communication section to communicate with another computer, and implement a multi-player game in an augmented reality space, the program causing the computer to:

display a character within a live view image displayed on the display section when a marker has been captured by the imaging section, the character being blended with the live view image;

calculate position information about the computer using a captured image of the marker, the position information about the computer including at least information that indicates a position of the computer with respect to the marker;

receive information about the other computer, the information about the other computer including position information about the other computer, the position information about the other computer including at least information that indicates a position of the other computer with respect to the marker; and control a display position of the character in the augmented reality space using the position information about the computer and the information about the other computer.

In the program, the position information about the computer may include information that indicates a distance of the computer with respect to the marker, the position information about the other computer may include information that indicates a distance of the other computer with respect to the marker, and the calculating of the position information about the computer may include calculating the information that indicates the distance of the computer with respect to the marker using the captured image of the marker.

In the program, the marker may have a predetermined shape, and may indicate a reference direction, the position information about the computer may include information about a relative positional relationship of the computer with respect to the marker, the position information about the other computer may include information about a relative positional relationship of the other computer with respect to the marker, and the calculating of the position information about the computer may include calculating the information about the relative positional relationship of the computer with respect to the marker using the reference direction indicated by the marker within the captured image of the marker.

According to the above configuration, the display position of the character in the augmented reality space can be controlled using the position information about the computer and the information about the other computer included in the information about the other computer. Specifically, even when implementing a multi-player game in which the distance or the relative position of the viewpoint of each player who participates in the game with respect to the marker changes momentarily, it is possible to display the character at an appropriate display position taking account of the distance and the positional relationship of the viewpoint of each player with respect to the marker. Therefore, even when placement of the character is controlled based on the viewpoint of one player, occlusion or an unnatural shift in display position of the character does not occur within the game screen observed by another player.

In the program,
the program may further cause the computer to set an area within the augmented reality space in which the character is displayed using the position information about the computer and the information about the other computer,
the controlling of the display position of the character may include displaying the character within the area.

The above configuration makes it possible to set an area in which the character can be displayed (i.e., an area in which an object (character in a CG space) can be displayed). It is possible to effectively control the display position of the character even when automatically controlling (AI control) a non-player character (NPC) by setting the above area. It is also possible to deal with the case of simultaneously displaying a plurality of characters that differ in size or action pattern by setting the above area corresponding to each character.

In the program,
the setting of the area may include setting the area using an imaging range of the computer and an imaging range of the other computer, the imaging range of the computer being an imaging range when capturing the marker using a positional relationship indicated by the position information about the computer, and the imaging range of the other computer being an imaging range when capturing the marker using a positional relationship indicated by the position information about the other computer included in the information about the other computer.

According to the above configuration, since the area is set based on the imaging range corresponding to the viewpoint of each player, it is possible to more reliably prevent a situation in which an unnatural display occurs when the marker cannot be captured due to a change in imaging direction (that may occur when the player moves the computer to follow the character), even when implementing a multi-player game.

In the program,
the setting of the area may include setting the area so as to include at least an overlapping area of the imaging range of the computer and the imaging range of the other computer.

According to the above configuration, the area can be set to include at least the overlapping area of the imaging range of the computer and the imaging range of the other computer.

In the program,
the setting of the area may include setting the area using a range when capturing the marker using the positional relationship indicated by the position information about the computer while changing an imaging direction within an imaging range of the marker as the imaging range of the computer, and using a range when capturing the marker using the positional relationship indicated by the position information about the other computer while changing the imaging direction within the imaging range of the marker as the imaging range of the other computer.

According to the above configuration, the imaging range of the computer and the imaging range of the other computer that are used to set the area are determined by changing only the imaging direction on the assumption that the imaging position is fixed. Since the area is set using the imaging range of the computer and the imaging range of the other computer determined as described above, it is possible to set a wide area taking account of the effects of shake or the like.

In the program,
the marker may have a planar shape, and
the setting of the area may include changing a depth of the imaging range of the computer in a direction from the computer to the marker using a depression angle with respect to a planar direction of the marker when viewed from the computer.

When using marker-based AR technology, it is necessary to determine the direction and the type of marker through image analysis by determining the design of the marker. In this case, the image analysis (recognition) capability is determined by the imaging angle (depression angle) with respect to the design surface of the marker. For example, when the depression angle with respect to the design surface of the marker is small (i.e., when the planar direction of the marker and the line-of-sight direction form a small angle), the size of the image of the marker captured by the imaging means is small, and image analysis (recognition) may be difficult. However, the size of the image of the marker increases (i.e., image analysis (recognition) is facilitated) when the depression angle is large.

Therefore, it is possible to set an area that is as large as possible by setting the depth of the imaging range of the computer corresponding to the depression angle with respect to the surface (plane) of the marker.

In the program,
the setting of the area may include calculating a distance from the marker to the computer and a distance from the marker to the other computer using the position information about the computer and the information about the other computer, and setting a size of the area based on the distance from the marker to the computer and the distance from the marker to the other computer.

According to the above configuration, an area having an appropriate size can be set corresponding to the positional relationship of the viewpoint of the player with respect to the marker.

In the program,
a plurality of types of the markers may be provided, and
the setting of the area may include:
setting a shape of the area based on the type of the marker captured by the imaging section; and
calculating a distance from the marker to the computer and a distance from the marker to the other computer using the position information about the computer and the information about the other computer, and setting a size of the area based on the distance from the marker to the computer and the distance from the marker to the other computer.

According to the above configuration, the shape of the area can be changed corresponding to the type of marker when using a plurality of types of markers, and an area having an appropriate size can be set corresponding to the positional relationship of the viewpoint of the player with respect to the marker.

In the program,
the computer may include a posture detection section that detects a posture of the computer,
the information about the other computer may include information about a posture detected by the posture detection section included in the other game device, and
the program may further cause the computer to control a display posture of the character using posture information about the computer that has been detected by the posture detection section, and posture information about the other computer that is included in the information about the other computer.

According to another aspect of the invention, there is provided a program for a computer to cause a plurality of user terminals to implement a multi-player game, the computer being able to communicating with each of the plurality of user terminals, and each of the plurality of user terminals including an imaging section and a display section, the multi-player game being a game that is implemented in an augmented reality space, and configured so that a character is displayed within a live view image displayed on the display section when a marker has been captured by the imaging section, the character being blended with the live view image, the program causing the computer to:

calculate a positional relationship of each of the plurality of user terminals with respect to the marker using a captured image of the marker captured by each of the plurality of user terminals; and control a display position of the character in the augmented reality space using the positional relationship of each of the plurality of user terminals.

According to the above configuration, the display position of the character in the augmented reality space can be controlled based on the positional relationship of each user terminal with respect to the marker. Specifically, even when implementing a game in which the relative position of the imaging means of each user terminal that participates in the game with respect to the marker changes momentarily, it is possible to display the character at an appropriate display position taking account of the position of each user terminal with respect to the marker. Therefore, it is possible to prevent or suppress a situation in which occlusion occurs, or it is impossible to capture the marker.

In the program, each of the plurality of user terminals may include a posture detection section that detects a posture of each of the plurality of user terminals, and the program may further cause the computer to:

receive information about the posture detected by the posture detection section from each of the plurality of user terminals; and control a display posture of the character using the information about the posture.

According to another aspect of the invention, there is provided a computer-readable storage medium storing the above program.

The term "storage medium" used herein includes a magnetic disk, an optical disk, an IC memory, and the like.

The above aspects of the invention may also be implemented as described below instead of using a program.

In other words, according to another aspect of the invention, there is provided a game device that includes an imaging section, a display section, and a communication section, and communicates with another game device to implement a multi-player game in an augmented reality space, the game device comprising:

a blend/display control section that displays a character within a live view image displayed on the display section when a marker has been captured by the imaging section, the character being blended with the live view image;

a position information calculation section that calculates position information about the game device using a captured image of the marker, the position information about the game device including at least information that indicates a position of the game device with respect to the marker;

an information reception section that receives information about the other game device, the information about the other game device including position information about the other game device, the position information about the other game device including at least information that indicates a position of the other game device with respect to the marker; and a character display control section that controls a display position of the character in the augmented reality space using the position information about the game device and the information about the other game device.

Furthermore, according to yet another aspect of the invention, there is provided a computer that causes a plurality of user terminals to implement a multi-player game, the computer being able to communicate with each of the plurality of user terminals, and each of the plurality of user terminals including an imaging section and a display section, the multi-player game being a game that is implemented in an augmented reality space, and configured so that a character is displayed within a live view image displayed on the display section when a marker has been captured by the imaging section, the character being blended with the live view image, the computer comprising:

a positional relationship calculation section that calculates a positional relationship of each of the plurality of user terminals with respect to the marker using a captured image of the marker captured by each of the plurality of user terminals; and a character display control section that controls a display position of the character in the augmented reality space using the positional relationship of each of the plurality of user terminals.

BRIEF DESCRIPTION OF DRAWINGS

FIG. 1 is a view illustrating a configuration example of a game device (computer) according to a first embodiment that is used to play a game.

FIG. 2 is a schematic view illustrating a play style according to the first embodiment.

FIG. 3 is a view illustrating an example of a game screen and a live view image.

FIG. 6 is a schematic view illustrating an element area setting method.

FIG. 7 is a schematic view illustrating the depth of an element area.

FIG. 9 is a schematic view illustrating usage of a relative position and a relative posture when an AR marker has been lost.

FIG. 10 is a schematic view illustrating a method that changes a game device that functions as a host device.

FIG. 15 is a view illustrating a data configuration example of an information queue.

FIG. 16 is a view illustrating a data configuration example of an enemy character placement information queue.

FIG. 28 is a view illustrating a data configuration example of terminal registration data.

FIG. 29 is a view illustrating a data configuration example of a terminal information queue.

DESCRIPTION OF EMBODIMENTS

Figure 4:
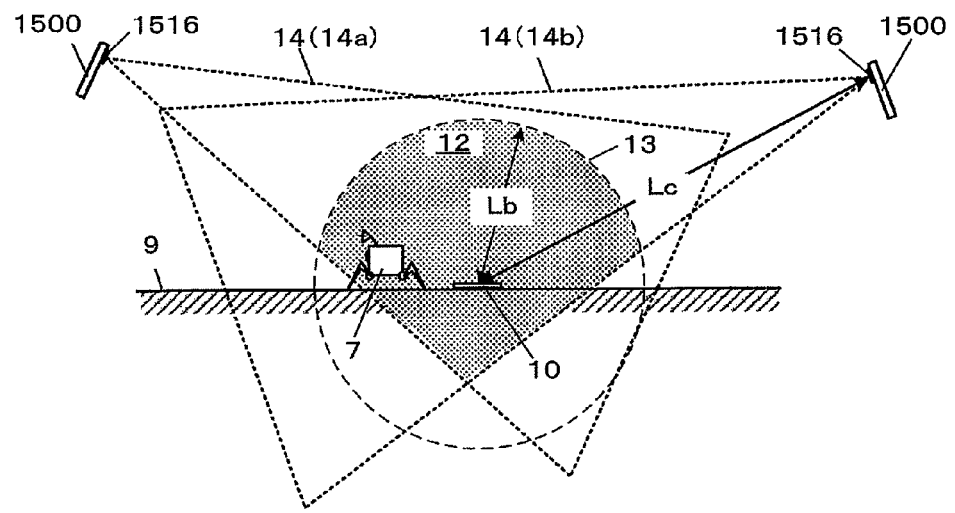
FIG. 4 is a schematic view illustrating an area that is set for placement of an enemy character.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

First Embodiment

A first embodiment of the invention is described below taking an example that executes a multi-player shooting game in an augmented reality space that is implemented using a marker-based AR.

FIG. 1 is a view (front external view (1) and rear external view (2)) illustrating a configuration example of a game device 1500 (i.e., computer (electronic device)) that is used to play the game according to the first embodiment. The game device 1500 includes an arrow key (direction input key) 1502, a home key 1504, a touch panel 1506, a speaker 1510, a microphone 1512, a Global Positioning System (GPS) antenna 1514, a CCD camera module 1516, a control board 1550, and a memory card reader 1542 that reads and writes data from and into a memory card 1540 (i.e., computer-readable storage medium). The game device 1500 also includes a built-in battery, a power button, a volume control button, and the like (not illustrated in FIG. 1).

The CCD camera module 1516 includes an autofocus mechanism, a CCD image sensor, and an image signal generation chip, and is disposed so that the rear side of the game device 1500 can be captured (photographed). Note that the image sensor is not limited to a CCD image sensor, but may be a CMOS image sensor or the like.

The control board 1550 includes a microprocessor (e.g., central processing unit (CPU) 1551, graphics processing unit (GPU), and digital signal processor (DSP)), an application-specific integrated circuit (ASIC), and an IC memory 1552 (e.g., VRAM, RAM, and ROM).

The control board 1550 also includes a wireless communication module 1553 for connecting to a wireless base station (e.g., mobile phone base station or wireless LAN base station) via wireless communication, an electronic compass 1555, a triaxial gyroscope 1556, and a triaxial acceleration sensor 1557.

The control board 1550 further includes interface (I/F) circuits such as a driver circuit that drives the touch panel 1506, a circuit that receives signals from the arrow key 1502 and the home key 1504, an output amplifier circuit that outputs sound signals to the speaker 1510, an input signal generation circuit that generates signals of voice input through the microphone 1512, and a signal input-output circuit that inputs and outputs signals to and from the memory card reader 1542. The elements included in (mounted on) the control board 1550 are electrically connected through a bus circuit or the like so that the elements can exchange data and signals.

The GPS module 1554 and the GPS antenna 1514 function as a means that acquires position information utilizing the GPS. The GPS module 1554 outputs the position information (e.g., latitude and longitude) and additional information (absolute time) every given time (e.g., every second) as data that can be processed by the control board 1550 based on signals output from a GPS satellite 3 and received by the GPS antenna 1514. Note that the positioning system is not limited to the GPS. A satellite positioning system other than the GPS, or a positioning system that does not utilize a satellite may also be used as the positioning system. When using a positioning system that does not utilize a satellite, the wireless communication module 1553 may acquire the position information that is set in advance to a wireless base station from the wireless base station via wireless communication, or may calculate the position information by a triangulation method that utilizes the time difference of arrival from three wireless base stations.

The control board 1550 reads a game program and data necessary for executing the game from the memory card 1540, and temporarily stores the game program and the data in the IC memory 1552. The control board 1550 executes the game program to perform a calculation process, and controls each section of the game device 1500 based on an operation input performed using the arrow key 1502, the home key 1504, and the touch panel 1506, and a change in posture/acceleration detected by the triaxial gyroscope 1556 or the triaxial acceleration sensor 1557 to implement a video game. Note that the game device 1500 may download the necessary program and setting data from a server or the like through the communication channel 1 instead of reading the necessary program and setting data from the memory card 1540.

Since the game device 1500 is a computer, the term "game device" used herein may be referred to as "computer", and the term "another game device" used herein may be referred to as "another computer".

Outline of Game

An outline of the game according to the first embodiment is described below.

FIG. 2 is a schematic view illustrating a play style according to the first embodiment, wherein (1) is a perspective view illustrating a state in a real space, (2) is a view illustrating the relationship between the CCD camera module 1516 of the game device 1500 and an AR marker 10, and (3) is a perspective view illustrating a state in a virtual three-dimensional space in which objects that appear in the game are disposed.

The video game according to the first embodiment is a multi-player shooting game that is classified as an AR game that utilizes an AR space that is implemented using the AR marker 10. As illustrated in FIG. 2 (see (1)), players PL1 to PL3 play the game while holding the game device 1500, and capturing the AR marker 10 placed on a table 9 or the like using the CCD camera module 1516. The game device 1500 possessed by the player PL1 initially functions as a host device that allows a client device to participate in the game, and controls an NPC (e.g., enemy character 7). The game devices 1500 respectively possessed by the players PL2 and PL3 function as a guest device that utilizes NPC control data acquired from the host device. Although FIG. 2 illustrates an example in which three players play the game, the number of players is not limited thereto.

The AR marker 10 according to the first embodiment is a card having a predetermined shape, and having a design pattern (design) that specifies the type of the AR marker 10, a reference direction being provided on at least one side of the AR marker 10. A plurality of types of AR markers 10 are provided in advance.

The CCD camera module 1516 is secured on the back side of the main body of the game device 1500 so as to capture the rear side of the game device 1500. Therefore, the viewpoint position of the player is the position of the game device 1500, and is considered to be the same as the viewpoint position of the CCD camera module 1516. Likewise, the viewpoint posture of the player is the posture of the game device 1500, and is considered to be the same as the posture of the CCD camera module 1516.

As illustrated in FIG. 2 (see (2)), the game device 1500 detects the AR marker 10 from the image captured by the CCD camera module 1516, and determines the type of the AR marker 10. The game device 1500 measures the three-dimensional relative position (Xc, Yc, Zc) and the three-dimensional relative posture ($\omega$p, $\omega$y, $\omega$r) with respect to the AR marker 10. For example, since the actual size of the AR marker 10 (card) is specified in advance, the relative position with respect to the real space can be calculated from the pixel size of the AR marker 10 within the image captured by the CCD camera module 1516.

The game device 1500 generates a game space based on the relative position and the relative posture measured as described above so that the surface (e.g., the surface of the table) on which the AR marker 10 is placed coincides with a reference surface (e.g., a ground in a game world or a virtual map) within the virtual three-dimensional space. The game space is indicated by the virtual three-dimensional space coordinate system (Xw, Yw, Zw), and is generated to coincide with the real space coordinate system (Xm, Ym, Zm) based on the AR marker 10.

As illustrated in FIG. 2 (see (3)), the virtual three-dimensional space is a CG space. Objects such as the enemy character 7 (target) and a background object are disposed in the virtual three-dimensional space to form the game space. Player characters PC1 to PC3 respectively operated by the players PL1 to PL3, and flying objects 6 (not illustrated in FIG. 2 (see FIG. 3)) respectively launched from the enemy character 7 and the player characters PC1 to PC3 are also disposed in the virtual three-dimensional space.

The virtual three-dimensional space generated by each game device 1500 has common coordinate axes in principle since the virtual three-dimensional space is generated based on the AR marker 10. Virtual cameras CM1 to CM3 that correspond to the respective game devices 1500 are set within the virtual three-dimensional space. The player characters PC1 to PC3 that correspond to the respective game devices 1500 are disposed at a given relative position (Xp, Yp, Zp) with respect to the virtual cameras CM1 to CM3 that correspond to the respective game devices 1500. In the first embodiment, the player characters PC1 to PC3 are respectively disposed diagonally downward and forward from the virtual cameras CM1 to CM3 so as to implement a third-person viewpoint. Note that the relative positional relationship between the player character and the virtual camera is determined in advance, but is not defined by an absolute fixed value. The relative positional relationship between the player character and the virtual camera may include an appropriate shift or fluctuation.

FIG. 3 is a view illustrating an example of a game screen and a live view image according to the first embodiment, wherein (1) is an example of a game screen displayed on the game device 1500 possessed by the player PL1, and (2) is an example of a live view image captured by the CCD camera module 1516.

Each game device 1500 generates a CG image viewed from the corresponding virtual camera (CM1, CM2, or CM3), and blends the generated CG image with the live view image captured by the CCD camera module 1516.

In the example illustrated in FIG. 3 (see (1)), the player character PC1 that is operated by the player PL1, the enemy character 7 that is positioned around the AR marker 10, the player PL2 who stands beside the table, and the player character PC2 that is operated by the player PL2 are displayed within the screen. Cross hairs 8 that are used by the player PL1 during the game are displayed at the center of the screen. A virtual world is thus generated as an augmented reality space (game space) by blending the CG image (e.g., game character) with the image of the real space, and is presented to the player.

In the first embodiment, the angle of view of the CCD camera module 1516 differs from the angle of view of the virtual cameras CM1 to CM3.

The CCD camera module 1516 is set to have a wide angle of view in order to provide a wide imaging range. For example, the focal length is set to 15 to 24 mm (in 35 mm format), and the nominal diagonal angle of view is set to about 90°. The angle of view of the virtual cameras CM1 to CM3 is set to be about 50% of the angle of view of the CCD camera module 1516 since the player plays the AR game as if to observe the real space through the touch panel 1506 of the game device 1500. It is preferable to set the angle of view of the virtual cameras CM1 to CM3 taking account of the play style as if the player were observing the real world through the display area of the touch panel 1506 while the player holds the game device 1500 in front of him while bending his elbow to some extent. For example, the focal length is set to 40 to 55 mm (in 35 mm format), and the nominal diagonal angle of view is set to about 45°.

Therefore, the background of the game screen illustrated in FIG. 3 (see (1)) is obtained by cropping the live view image captured by the CCD camera module 1516 (see (2) in FIG. 3) corresponding to the angle of view of the virtual cameras CM1 to CM3.

Placement of Enemy Character

Since the game according to the first embodiment is a marker-based AR game, it is desirable for the player to play the game so that the AR marker 10 is always included within the imaging range of the CCD camera module 1516 in order to appropriately match the coordinate system of the real space with the coordinate system of the virtual three-dimensional space.

When the player plays a shooting game, the player changes the position and the posture of the game device 1500 during the game so that the cross hairs 8 coincide with the enemy character 7. Therefore, when the enemy character 7 is significantly positioned away from the AR marker 10, the AR marker 10 may be lost (i.e., the AR marker 10 lies outside the imaging range) as a result of aiming at the enemy character 7. However, the player tries to adjust the position and the posture of the game device 1500 to have the enemy character 7 in the cross hairs 8. Therefore, it is possible to instruct the player to control the game device 1500 so that the AR marker 10 lies within the imaging range (i.e., the AR marker 10 does not lie outside the imaging range) by appropriately controlling the position of the enemy character 7.

In the first embodiment, a placement area 12 (shaded area (range) in FIG. 4) is set corresponding to the position and the posture of the game device that participates in the game, and the enemy character 7 is disposed within the placement area 12. The placement area 12 is designed so that the AR marker 10 is rarely lost when the enemy character 7 is disposed within the placement area 12. In the first embodiment, the placement area 12 is set to be an overlapping area of a basic area 13 and an element area 14 that is calculated corresponding to each game device that participates in the game (i.e., corresponding to the viewpoint of each player). Note that FIG. 4 illustrates only two game devices 1500 for convenience of explanation.

Figure 5:
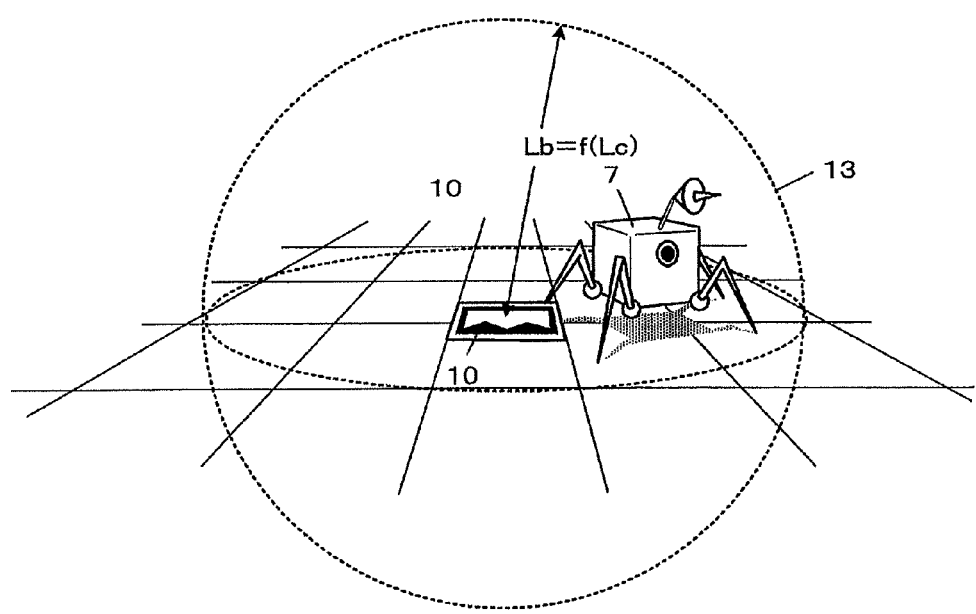
FIG. 5 is a schematic view illustrating a basic area.

FIG. 5 is a schematic view illustrating a basic area setting method.

The basic area 13 is set to be a range having a given shape that is formed around the AR marker 10, and is defined by a basic length Lb. The basic length Lb is obtained by a function f(Lc) wherein the relative distance Lc of the game device from the AR marker 10 (see (2) in FIG. 2) is a variable.

The shape of the basic area 13 is set in advance corresponding to the type of AR marker 10. In the example illustrated in FIG. 5, the basic area 13 has a spherical shape having a radius of Lb (=basic length). Note that the basic area 13 may have a cubic shape wherein the distance from the cube center to each vertex is Lb (=basic length), for example. The basic area 13 may have an appropriate shape in which the basic length Lb is assigned to an arbitrary dimension.

A minimum value among the relative distances Lc of the respective game devices from the AR marker 10 is taken as the relative distance Lc used as the variable of the function f(Lc). Note that a minimum value is set in advance as the value output from the function f(Lc). The minimum value is set in order to prevent a situation in which the moving range of the enemy character 7 becomes too small. Note that the relative distance Lc used as the variable of the function f(Lc) is not limited to a minimum value among the relative distances Lc of the respective game devices, but may be a maximum value, an average value, a median value, or the like.

FIG. 6 is a schematic view illustrating an element area setting method. The element area 14 is set to be an imaging range with respect to the game device 1500 (i.e., the viewpoint of the player) within which a change in posture can occur so that the AR marker 10 lies within the imaging range of the CCD camera module 1516.

For example, the AR marker 10 is displayed as illustrated in FIG. 6 (see (1)) within the live view image captured by the CCD camera module 1516. Note that the outer rectangular frame is the contour of the live view image (i.e., capture frame). The inner rectangular frame is the contour of the game screen (background) that is obtained by cropping the live view image.

When determining the imaging range within which a change in posture can occur so that the AR marker 10 lies within the imaging range of the CCD camera module 1516, the degree by which a change in imaging direction of the CCD camera module 1516 is allowed is determined on the assumption that the position of the game device 1500 is fixed.

As illustrated in FIG. 6 (see (2)), a first posture and the optical axis AL1 of the CCD camera module 1516 corresponding to the first posture are determined, the first posture satisfying a condition whereby the right end of the AR marker 10 is situated adjacent to the right end of the capture frame to satisfy a given condition, and the lower end of the AR marker 10 is situated adjacent to the lower end of the capture frame in a state in which the current size of the AR marker 10 is maintained. A second posture and the optical axis AL2 of the CCD camera module 1516 corresponding to the second posture are then determined, the second posture satisfying a condition whereby the left end of the AR marker 10 is situated adjacent to the left end of the capture frame, and the upper end of the AR marker 10 is situated adjacent to the upper end of the capture frame on the assumption that the imaging direction has been changed from the first posture in the diagonal direction.

As illustrated in FIG. 6 (see (3)), a third posture and the optical axis AL3 of the CCD camera module 1516 corresponding to the third posture are determined, the third posture satisfying a condition whereby the left end of the AR marker 10 is situated adjacent to the left end of the capture frame to satisfy a given condition, and the lower end of the AR marker 10 is situated adjacent to the lower end of the capture frame. A fourth posture and the optical axis AL4 of the CCD camera module 1516 corresponding to the fourth posture are then determined, the fourth posture satisfying a condition whereby the right end of the AR marker 10 is situated adjacent to the right end of the capture frame, and the upper end of the AR marker 10 is situated adjacent to the upper end of the capture frame on the assumption that the imaging direction has been changed from the third posture in the diagonal direction.

As illustrated in FIG. 6 (see (4)), a quadrangular pyramid area that is formed from the viewpoint position of the CCD camera module 1516, and is defined by the four optical axes AL1 to AL4 is determined to be the element area 14.

A depth Db of the element area 14 that corresponds to the height of the quadrangular pyramid area is set based on the depression angle θc with respect to the planar direction of the AR marker 10 when viewed from the viewpoint of the player (see FIG. 7).

FIG. 7 is a schematic view illustrating the concept of the depth of the element area 14.

As illustrated in FIG. 7 (see (1)), the depth Db of the element area 14 is the maximum distance from the viewpoint at which the AR marker 10 can be appropriately recognized. As illustrated in FIG. 7 (see (2)), the AR marker 10 can be most appropriately recognized when the CCD camera module 1516 captures the AR marker 10 at a position directly in front of the AR marker 10 (depression angle θc=π (90°)) (i.e., the depth Db becomes a maximum (Db1)). The recognition capability decreases as the depression angle θc with respect to the plane (design surface) of the AR marker 10 decreases (Db2), and finally reaches an impractical level (θmin).

The relationship between the depression angle θc and the depth Db is determined by the resolution based on the image sensor and the optical system of the CCD camera module 1516, the size of the AR marker 10, and the like. In the first embodiment, a plurality of AR markers 10 that differ in size are provided, and classified in advance corresponding to the size thereof. The type of each AR marker 10 can be determined by recognizing the design of the AR marker 10. As illustrated in FIG. 7 (see (3)), a function g(θc) that outputs the depth Db using the depression angle θc as a variable is set corresponding to each AR marker 10. The function g(θc) is selected corresponding to the type of the recognized AR marker 10, and the depth Db is calculated using the depression angle θc.

When the angle of view of the virtual cameras CM1 to CM3 is narrower than the angle of view of the CCD camera module 1516, and the cross hairs 8 are displayed at the center of the game screen, the AR marker 10 can be displayed within the imaging range of the CCD camera module 1516 even when the player has changed the position or the posture of the game device 1500 to some extent while having the enemy character 7 in the cross hairs 8 when the imaging range is indicated by the element area 14.

As illustrated in FIG. 4, the placement area 12 is set to be an overlapping area of the basic area 13 and the element area 14 (14a, 14b) that is calculated corresponding to each game device (i.e., corresponding to the viewpoint of each player) (i.e., the placement area 12 is set to be an overlapping area of four areas).

When the angle of view of the virtual cameras CM1 to CM3 is narrower than the angle of view of the CCD camera module 1516, and the cross hairs 8 are displayed at the center of the game screen, the AR marker 10 is always correctly recognized as long as the enemy character 7 is disposed within the placement area 12, and a problem in which the display position of the game character is shifted with respect to the real space does not occur.

Even when the AR marker 10 is not displayed within the game screen displayed on the touch panel 1506, the CCD camera module 1516 can continuously capture the AR marker 10. Specifically, the AR game normally continues even in a state in which the AR marker 10 is not always displayed within the game screen. For example, the enemy character 7 is observed as if the enemy character 7 were walking along the surface of the table on which the AR marker 10 is placed.

Since the enemy character 7 is displayed while maintaining consistency with the real space even in a state in which the AR marker 10 is not displayed within the game screen, the player feels as if the game were performed using the entire large space where the player is present (i.e., the player does not feel that the game cannot be played at a position away from the AR marker 10). This makes it possible to implement a more interesting AR game.

Since the placement area 12 has a shape differing from that of the basic area 13 due to the effects of a plurality of element areas 14 that change in shape, the moving range of the enemy character 7 becomes irregular. This also makes it possible to implement a more interesting game.

Moreover, when the basic area 13 is used to set the placement area 12, the placement position of the enemy character 7 can be appropriately maintained even when all of the game devices 1500 cannot recognize the AR marker 10 (i.e., even when the element area 14 is not obtained).

First Auxiliary Function Provided Taking Account of Situation in which AR Marker is Lost Even if the placement area 12 is set as described above, it may be difficult to continuously capture the AR marker 10. For example, the player may be excited, and excessively move the game device 1500 toward the enemy character 7, whereby the AR marker 10 unintentionally lies outside the imaging range of the CCD camera module 1516. In the first embodiment, two auxiliary functions are provided so that it is possible to proceed with the game even when the AR marker 10 has been lost.

The first auxiliary function is described below.

Figure 8:
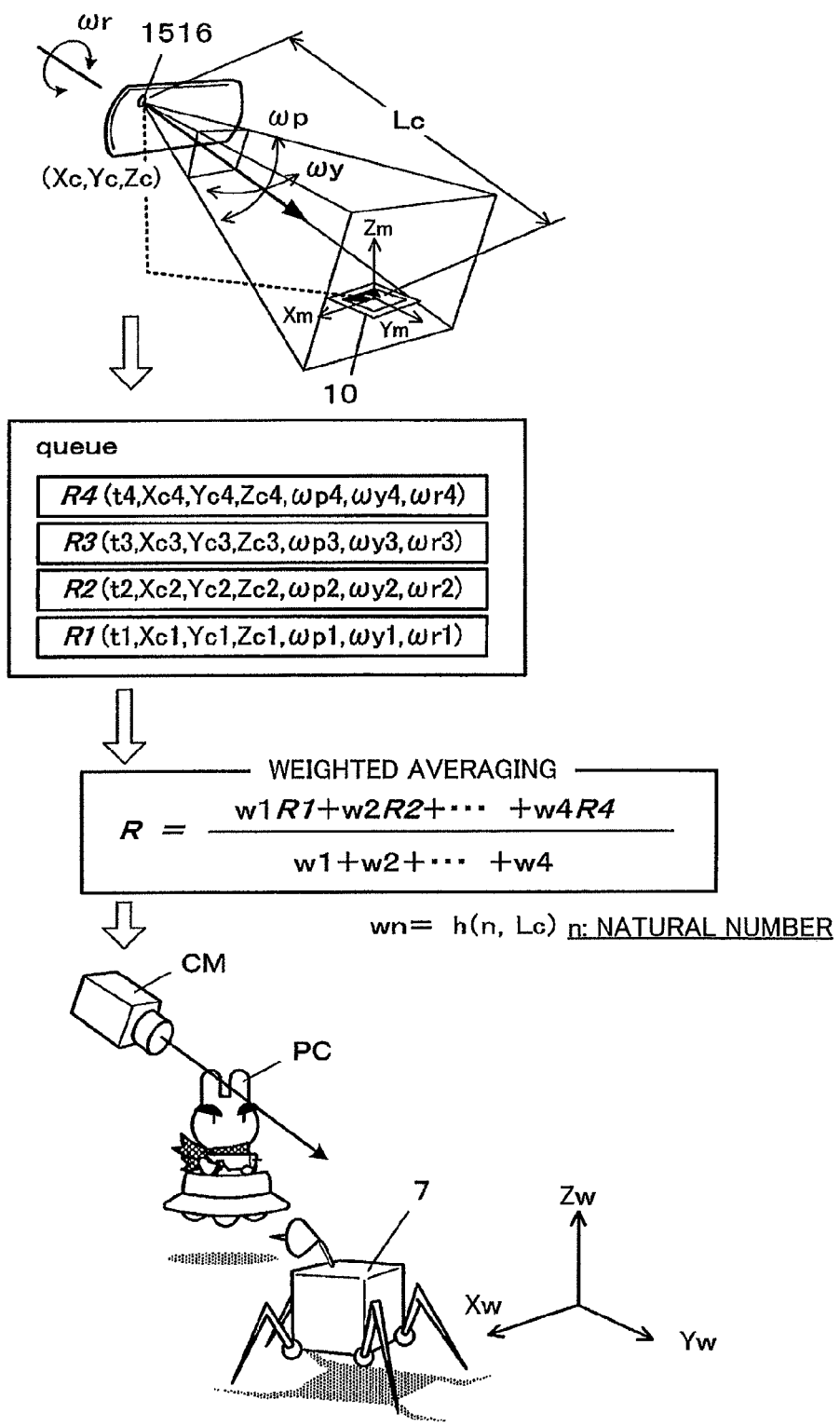
FIG. 8 is a schematic view illustrating usage of the relative position and the relative posture of the viewpoint of the player with respect to an AR marker.

FIG. 8 is a schematic view illustrating usage of the relative position and the relative posture of the viewpoint of the player with respect to the AR marker 10 based on which the first auxiliary function is provided.

The game device 1500 according to the first embodiment calculates the relative position ($X_{cn}$, $Y_{cn}$, $Z_{cn}$) and the relative posture ($\omega_{pn}$, $\omega_{yn}$, $\omega_{rn}$) of the game device 1500 with respect to the AR marker 10 at a time t1, t2, . . . , and tm (m is a natural number that indicates the calculation timing) in a given cycle. A given number of calculated relative positions and a given number of calculated relative postures are stored/managed in a queue in a first-in first-out manner. A weighted average of the relative positions stored in the queue and a weighted average of the relative postures stored in the queue are calculated, and the calculated weighted averages are respectively considered to be the current position and the current posture, and used as the position and the posture of the virtual camera CM in the CG space. In the example illustrated in FIG. 8, four relative positions and four relative postures are stored in the queue. Note that an arbitrary number of relative positions and an arbitrary number of relative postures may be stored in the queue.

The weight wn used to calculate a weighted average (n is a natural number that indicates the calculation timing) is determined by a weighting function h(n, Lc) wherein the calculation timing (order) n and the relative distance L of the viewpoint of the player with respect to the AR marker 10 are used as variables.

The weighting function h(n, Lc) may be appropriately set. In the first embodiment, the largest weight wn is applied to the latest relative position and the latest relative posture, and a relatively small weight wn is applied to the relative position and the relative posture other than the latest relative position and the latest relative posture. The weight wn is set so that the difference in weight wn decreases as the relative distance Lc increases. Specifically, a weight is also applied to the previous relative position and the previous relative posture.

When the average value of the relative positions and the average value of the relative postures (current position and current posture) are used to control the virtual camera CM during the AR display control process, it is possible to suppress a jitter (undesirable small vibrations of the AR display object (e.g., game character)) due to shake of the hand that holds the game device 1500, instantaneous movement of the player character or the like due to rapid movement or a rapid change in posture of the game device 1500 (i.e., it is possible to suppress an unnatural display).

The effects of shake or the like increase when the game device 1500 captures the AR marker 10 from a distance. However, since the weighting function h(n, Lc) is set so that a relatively large weight wn is applied to the previous value when the relative distance Lc is long, the effects of shake or the like can be reduced. The weighting function h(n, Lc) is set so that a relatively small weight wn is applied to the previous value when the AR marker 10 is closely captured. In this case, the effects of shake increase. However, such shake produces a visual effect that creates a feeling of a sense of urgency and reality of proximate battle.

In the first embodiment, when the AR marker 10 has been lost, the control process using the above weighted average is performed on the assumption that the relative position with respect to the AR marker 10 is fixed, and only a change in posture occurs.

FIG. 9 is a view illustrating usage of the relative position and the relative posture when the AR marker 10 has been lost.

In the first embodiment, when the AR marker has been lost, the relative position is fixed to the value immediately before the AR marker has been lost until the AR marker 10 is recognized again. In the example illustrated in FIG. 9, the AR marker 10 is situated within the imaging range of the CCD camera module 1516 up to a timing t4 (i.e. the relative position with respect to the AR marker 10 is normally calculated, and is lost at a timing t5. Therefore, the relative positions at the timings t5 to t7 stored in the queue are fixed to the value at the timing t4 immediately before the AR marker 10 is lost. On the other hand, a weighted average is calculated using the relative postures. Specifically, the control process is performed on the assumption that the game device 1500 does not change in position, but changes only in posture at the timings t5 to t7.

It is possible to maintain a state in which the game screen changes by temporarily performing the control process on the assumption that the relative position fixed (the game device 1500 may actually change in position when the AR marker 10 is lost). It is possible to continue the game even if the relative position is not correctly calculated.

Since the AR display control process is continuously performed on the assumption that the relative position (i.e., the position of the virtual camera) is fixed, it is possible to effectively suppress unnatural instantaneous movement or a choppy motion of the player character or the like, for example.

Second Auxiliary Function Provided Taking Account of Situation in which AR Marker is Lost In the first embodiment, the guest device can function as the host device when the AR marker 10 has been lost (second auxiliary function). Specifically, the game-participating device can succeed the host function corresponding to the marker recognition state.

FIG. 10 is a schematic view illustrating a method that changes the game device that functions as the host device. FIG. 10 illustrates an example of the combination of the AR marker recognition state of three game devices 1500 that participate in the game, and the game device 1500 that functions as the host device. In FIG. 10, "In Sight" refers to a state in which the AR marker 10 is recognized, and "LOST" refers to a state in which the AR marker 10 lies outside the imaging range, and cannot be recognized (LOST state).

The game device 1500*a* that initially functions as the host device performs the game participation acceptance process. The game devices 1500*b* and 1500*c* that have been allowed to participate in the game function as the guest device.

The game device 1500*a* that functions as the host device sets the highest host priority to the game device 1500*a*, and sets a relatively low host priority to the guest devices in order of participation (acceptance). In FIG. 10, the white numeral provided to each game device indicates the host priority.

Each of the game device 1500*a*, 1500*b*, and 1500*c* can transmit a given LOST signal to the other game device when the AR marker 10 has been lost. Specifically, each game device can determine the marker recognition state of the other game device based on whether or not the LOST signal has been received from the other game device.

The game device 1500*a* that initially functions as the host device continuously functions as the host device when all of the game devices that participate in the game can recognize the AR marker 10 (see (1) in FIG. 10).

Specifically, the game device 1500*a* controls the player character PC1, the NPC (non-player character) (e.g., enemy character 7), the background object, and the effect object (e.g., bullet), and transmits the placement position information and the like to the guest devices. The game device 1500*a* sets the placement area 12 when controlling the enemy character 7.

The game devices 1500*b* and 1500*c* that function as the guest device control the motion of the player character PC2 or PC3, and the position of the player character PC2 or PC3 in the virtual three-dimensional space based on the operation input and the movement of the game device. The game devices 1500*b* and 1500*c* control the positions of the enemy character 7 and the like in the virtual three-dimensional space based on the information received from the host device. Specifically, the host device and the guest device have a client/server relationship with regard to control of the object.

When the game device 1500*a* that initially functions as the host device has become unable to recognize the AR marker 10, it is likely that the real space and the virtual three-dimensional space are misaligned, and the enemy character 7 is disposed in a tilted state, for example. Since the guest device that acquires the placement position information about the enemy character 7 from the host device, the enemy character 7 may be unnaturally displayed although the AR marker 10 is not lost.

In order to deal with such a situation, the game device 1500 transmits a given LOST signal to the other game device when it has been detected that the AR marker 10 has been lost. When the game device that functions as the host device has lost the AR marker 10, the game device transmits the LOST signal, and stops functioning as the host device.

The game device that functions as the guest device determines to function as the host device when each game device to which a relatively high host priority has transmitted the LOST signal, and functions as the host device.

Specifically, when the game device 1500*a* that initially functions as the host device has lost the AR marker 10, the game device 1500*a* transmits the LOST signal, and starts to function as the guest device instead of the host device (see (2) in FIG. 10). The game device 1500*a* stops controlling the enemy character 7, and transmitting the control results.

The game device 1500*b* (guest device) to which the second highest host priority is assigned starts to function as the host device (since each game device to which a relatively high host priority has transmitted the LOST signal), and starts to control the enemy character 7, and transmit the control results. Specifically, the game device 1500*b* succeeds the host function. The game device 1500*c* (guest device) to which the third highest host priority is assigned continuously functions as the guest device.

When the game device 1500*b* that functions as the host device has lost the AR marker 10, the game device 1500*b* starts to function as the guest device instead of the host device (see (3) in FIG. 10). In this case, the game device 1500*c* (guest device) to which the third highest host priority is assigned starts to function as the host device since each game device to which a relatively high host priority has transmitted the LOST signal.

When the game device 1500*a* that initially functions as the host device has then recognized the AR marker 10 again, the game device 1500*a* functions as the host device, and stops transmitting the LOST signal. The game device 1500*c* stops functioning as the host device when the game device 1500*a* has stopped transmitting the LOST signal, and then functions as the guest device.

According to the first embodiment, one of the game devices that recognize the AR marker 10 can thus perform the object positioning process with respect to the AR marker 10. It is possible to prevent a situation in which the real space and the virtual three-dimensional space (CG space) are misaligned when the game device that functions as the host device has lost the AR marker, and the enemy character 7 is disposed in a tilted state, for example, by causing the guest device to temporarily function as the host device.

Functional Blocks

A functional configuration that implements the first embodiment is described below.

Figure 11:
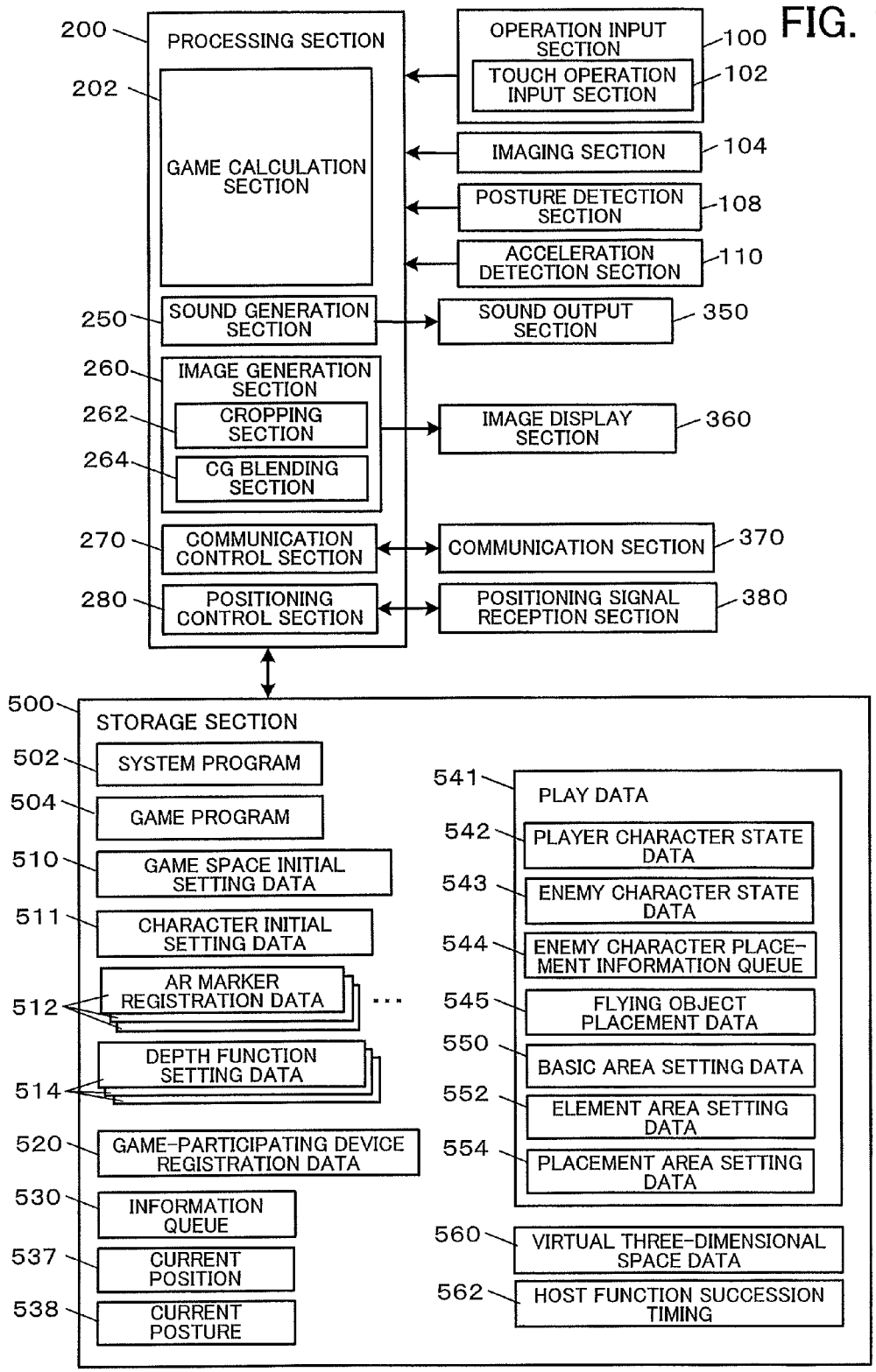
FIG. 11 is a functional block diagram illustrating a functional configuration example according to the first embodiment.

FIG. 11 is a functional block diagram illustrating an example of the functional configuration of the game device 1500 according to the first embodiment. The game device 1500 includes an operation input section 100, an imaging section 104, a posture detection section 108, an acceleration detection section 110, a processing section 200, a sound output section 350, an image display section 360, a communication section 370, a positioning signal reception section 380, and a storage section 500.

The operation input section 100 outputs an operation input signal to the processing section 200 corresponding to an operation input performed by the player. The operation input section 100 may be implemented by a device that is operated directly by the player with a finger (e.g., button switch, joystick, touch pad, or trackball), a device that detects motion or posture (e.g., acceleration sensor, angular velocity sensor, tilt sensor, or terrestrial magnetism sensor), or the like. The arrow key 1502 and the home key 1504 illustrated in FIG. 1 correspond to the operation input section 100. The triaxial gyroscope 1556 and the triaxial acceleration sensor 1557 also correspond to the operation input section 100 when utilizing the values (i.e., operation inputs) detected by the triaxial gyroscope 1556 and the triaxial acceleration sensor 1557. The operation input section 100 according to the first embodiment includes a touch operation input section 102 that allows the player to perform an operation input by touching the display screen with a finger or the like. The touch panel 1506 illustrated in FIG. 1 corresponds to the touch operation input section 102.

The imaging section 104 converts light received from the imaging target into electrical signals to generate digital image data, and outputs the digital image data to the processing section 200. The imaging section 104 may be implemented by a lens, a mechanical shutter, a shutter driver, a photoelectric conversion device (e.g., CCD image sensor module or CMOS image sensor module), a digital signal processor (DSP) that reads the amount of charge from a photoelectric conversion device, and generates image data, an IC memory, and the like. The CCD camera module 1516 illustrated in FIG. 1 corresponds to the imaging section 104.

The posture detection section 108 detects a change in posture of the game device 1500 to generate detection signals, and outputs the detection signals to the processing section 200. The posture detection section 108 may be implemented by an electronic compass, a gyroscope, or the like. The electronic compass 1555 and the triaxial gyroscope 1556 illustrated in FIG. 1 correspond to the posture detection section 108. It is preferable to calculate the roll, the pitch, and the yaw as the posture corresponding to the direction of the imaging optical axis of the imaging section 104. In the first embodiment, since the CCD camera module 1516 is secured on the game device 1500, the posture detection section 108 detects a change in posture from the viewpoint of the player.

The acceleration detection section 110 detects the acceleration applied to the game device 1500. The triaxial acceleration sensor 1557 illustrated in FIG. 1 corresponds to the acceleration detection section 110. In the first embodiment, since the CCD camera module 1516 is secured on the game device 1500, the acceleration detection section 110 detects the acceleration along with the movement of the viewpoint of the player.

The processing section 200 is implemented by appropriately combining electronic parts such as a microprocessor (e.g., CPU and GPU), an ASIC, and an IC memory. The processing section 200 exchanges data with (controls data exchange between) each functional section, and performs a calculation process based on a given program, data, the operation input signal from the operation input section 100, and the like to control the operation of the game device 1500. The control board 1550 illustrated in FIG. 1 corresponds to the processing section 200.

The processing section 200 includes a game calculation section 202, a sound generation section 250, an image generation section 260, a communication control section 270, and a positioning control section 280.

The game calculation section 202 performs a control process necessary for implementing the game according to the first embodiment. The game calculation section 202 appropriately performs a time measurement process (e.g., time limit measurement process) that utilizes a system clock, a flag management process, and the like.

Figure 12:
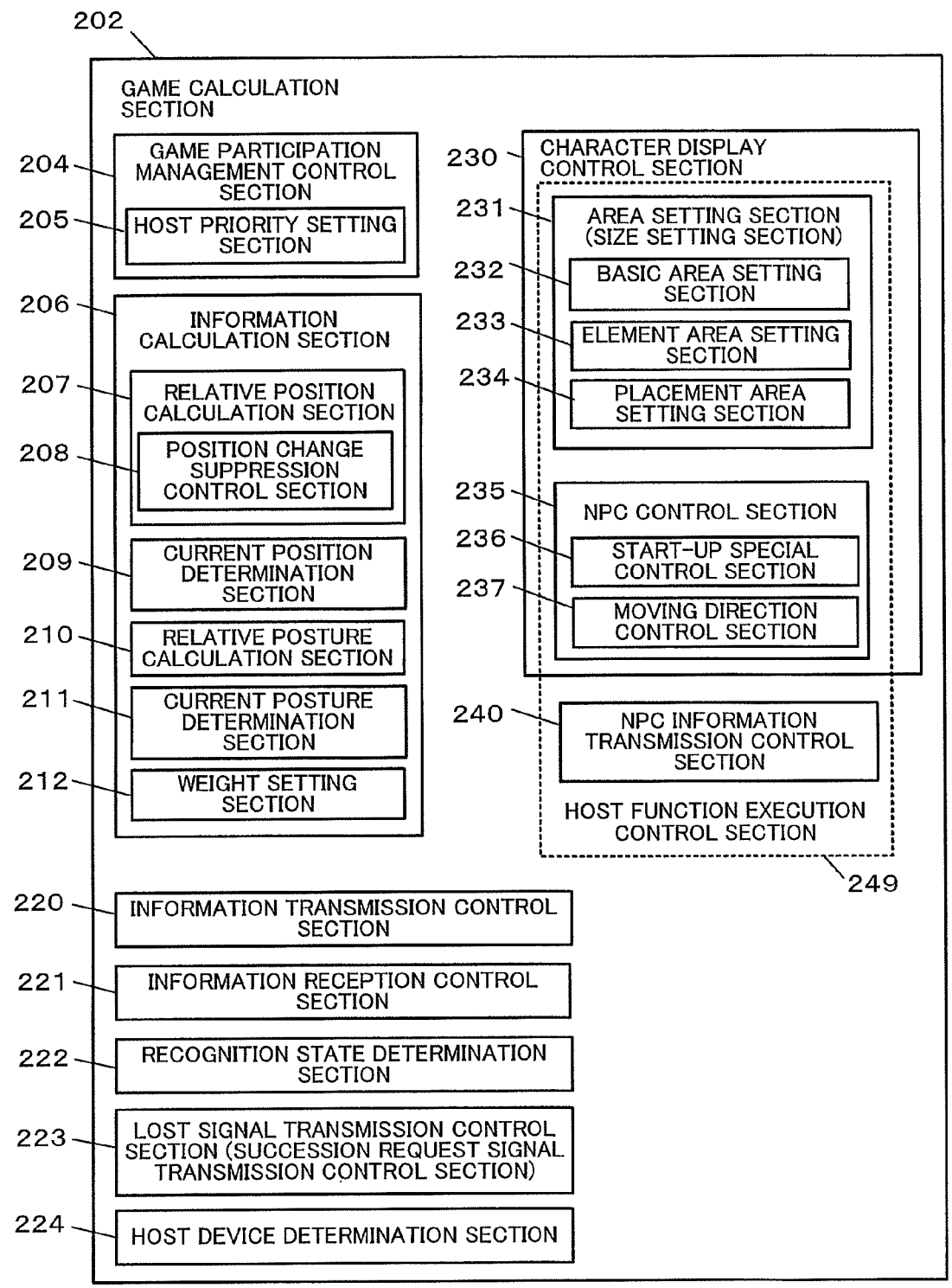
FIG. 12 is a functional block diagram illustrating a functional configuration example of a game calculation section according to the first embodiment.

FIG. 12 is a partial functional block diagram illustrating a configuration example of the game calculation section 202 according to the first embodiment. The game calculation section 202 according to the first embodiment includes a game participation management control section 204, an information calculation section 206, an information transmission control section 220, an information reception control section 221, a recognition state determination section 222, a LOST signal transmission control section 223, a host device determination section 224, a character display control section 230, and an NPC information transmission control section 240.

The game participation management control section 204 performs a multi-player game participation-related process. For example, the game participation management control section 204 allows the player to select whether to use the game device as the host device or the guest device. When the player has selected to use the game device as the host device, the game participation management control section 204 allows another game device to participate in the game, registers the other game device as a game-participating device, and performs a process relating to the distribution of registration information about the game-participating device. The game participation management control section 204 also performs a player character setting process that allows the player to select the type of player character regardless of whether the game device is used as the host device or the guest device, for example. The game participation management control section 204 distributes player character setting information to the other game device.

The game participation management control section 204 according to the first embodiment includes a host priority setting section 205. The host priority setting section 205 sets a host priority to another game device when the game device functions as the host device, and distributes the host priority to the other game device.

The information calculation section 206 calculates information about the positional relationship of the viewpoint of the player with respect to the AR marker 10. The information calculation section 206 according to the first embodiment includes a relative position calculation section 207, a current position determination section 209, a relative posture calculation section 210, a current posture determination section 211, and a weight setting section 212.

The relative position calculation section 207 cyclically calculates information that indicates the relative positional relationship of the game device with respect to the AR marker 10 using the captured image of the AR marker 10. Specifically, the relative position calculation section 207 measures and calculates the latest relative position of the viewpoint of the player.

The information about the relative position is not particularly limited. For example, a given position (e.g., the center or an arbitrary corner of the card) of the AR marker 10 is set to be a reference point, and the orthogonal coordinates (Xm, Ym, Zm) based on the reference direction indicated by the AR marker 10 are calculated. The relative position (Xc, Yc, Zc) and the relative distance Lc in the coordinate system are calculated. Specifically, the image captured by the imaging section 104 is analyzed to detect the AR marker 10. The type and the direction (orientation) of the AR marker 10 are determined, and the relative position with respect to the AR marker 10 is calculated. The above process may be implemented by appropriately utilizing a known AR technique. The relative distance Lc (actual distance) is calculated based the card size (actual size (e.g., 5×7 cm)) that is set in advance corresponding to the type of the AR marker 10, and the number of dots of the AR marker 10 within the captured image.

In the first embodiment, the relative position calculation section 207 functions as a position change suppression control section 208.

The position change suppression control section 208 suppresses a change in position of the object in the game space when the AR marker 10 cannot be recognized (i.e., when the LOST state has occurred). Specifically, the relative position is determined on the assumption that the position of the game device has not changed (i.e., the position of the viewpoint of the player has not changed) during a period until the In Sight state occurs. More specifically, the relative position calculated after the LOST state has occurred is fixed to the relative position calculated immediately before occurrence of the LOST state, and the fixed state is canceled after the AR marker 10 has been recognized again (see FIG. 9). In other words, the position change suppression control section 208 functions as a LOST state direction control section that controls the display direction (orientation) of the object corresponding to a change in posture of the computer when the LOST state is detected.

The current position determination section 209 calculates a weighted average of a specific number of pieces of previous relative position information and the latest relative position information calculated by the relative position calculation section 207 using the weight Wn set by the weight setting section 212 to calculate the position information applied when controlling the virtual camera CM (see FIG. 8).

The relative posture calculation section 210 cyclically calculates posture information about the game device based on the detection result of the posture detection section 108. For example, the relative posture calculation section 210 calculates the relative posture ($\omega p$, $\omega y$, $\omega r$) (pitch, yaw, and roll) with respect to the orthogonal coordinates (Xm, Ym, Zm) based on a given position (e.g., the center or an arbitrary corner of the card) of the AR marker 10 that is set to be the reference point, and the reference direction indicated by the AR marker 10.

The current posture determination section 211 calculates a weighted average of a specific number of pieces of previous posture information and the latest posture information using the weight set by the weight setting section 212 to calculate the posture information applied when controlling the virtual camera CM (see FIG. 8).

The weight setting section 212 determines the weight Wn (see FIG. 8) applied to each piece of information calculated at a different timing and used to calculate a weighted average by referring to a given function or given table data corresponding to the calculation timing linked to the latest relative distance Lc. Specifically, the weight setting section 212 implements a first weight change function that applies a weight corresponding to the calculation timing of the game device position information and the game device posture information used to calculate a weighted average, and a second weight change function that applies a weight corresponding to the distance L from the AR marker 10 when calculating the game device position information and the game device posture information.

The information transmission control section 220 causes the game device to transmit various types of information about the game device to the other game device that participates in the game. For example, the information includes operation input information input through the operation input section 100, information about the current position, the current posture, and the relative distance Lc, definition information about the element area 14, and the like.

The information reception control section 221 controls reception of information about the other game device (e.g., operation input information input through the operation input section 100, information about the current position, the current posture, and the relative distance Lc, and the definition information about the element area 14).

The recognition state determination section 222 detects the recognition state of the AR marker 10. Specifically, the recognition state determination section 222 detects that the LOST state has occurred when the AR marker 10 cannot be detected within the image captured by the imaging section 104, or the design pattern of the AR marker 10 could not be recognized, and detects that the In Sight state has occurred again when the AR marker 10 has been recognized.

The LOST state may be a state in which the AR marker 10 is situated away from the game device, and information sufficient to determine the design pattern cannot be obtained due to the relationship with the resolution of the imaging section 104, or may be a state in which the angle formed by the optical axis direction of the CCD camera module 1516 and the surface of the AR marker 10 is small, and information sufficient to determine the design pattern cannot be obtained, or may be a state in which part of the AR marker 10 lies outside the imaging range, and information sufficient to determine the design pattern cannot be obtained, for example.

The LOST signal transmission control section 223 causes the game device to transmit a specific LOST signal to another game device that participates in the game when the recognition state determination section 222 has detected that the LOST state has occurred. The LOST signal transmission control section 223 functions as a succession request signal transmission control section that transmits a succession request signal that requests another game device to function as the host device.

The host device determination section 224 determines whether or not to cause the game device to function as the host device based on the presence or absence of the LOST state. In the first embodiment, the host device determination section 224 determines to cause the game device to function as the host device when the LOST state has been detected for the other game device to which a host priority higher than that of the game device is assigned, based on the host priority set to the game device, and the LOST state monitoring results for the game device and the other game device.

The character display control section 230 controls the placement of each object (e.g., character) in the virtual three-dimensional space (CG space) based on the positional relationship between each game-participating device and the AR marker 10. Specifically, the character display control section 230 controls the display position of each character (e.g., player characters PC1 to PC3 and enemy character 7) in the augmented reality space. The character display control section 230 according to the first embodiment includes an area setting section 231 and an NPC control section 235.

The area setting section 231 sets an area within the augmented reality space in which a given object (e.g., enemy character 7) is displayed. Specifically, the area setting section 231 includes a basic area setting section 232, an element area setting section 233, and a placement area setting section 234.

The basic area setting section 232 sets the basic area 13 based on the relative distance Lc from the AR marker 10 to the viewpoint of each player. Specifically, the basic area setting section 232 sets the basic size of the placement area 12. The basic area setting section 232 calculates the basic length Lb of the basic area 13 using a given function f(Lc) for which a minimum value among the relative positions Lc of the respective game-participating devices is used as the variable. The basic area setting section 232 changes (enlarges or reduces) the size of the basic shape that is set in advance corresponding to the type of AR marker 10 so that a given dimension is equal to the basic length Lb to set the basic area 13.

The element area setting section 233 sets the element area 14 using the imaging range of the game device and the imaging range of the other game device when capturing the AR marker 10 from the viewpoint position of each player, the element area 14 being an area in which the enemy character 7 can be disposed so that the AR marker 10 is rarely lost when viewed from the viewpoint of each player. The element area setting section 233 functions as a depth change section that changes the depth of the imaging range of the game device and the depth of the imaging range of the other game device using the depression angle θc with respect to the planar direction of the AR marker when viewed from the viewpoint of the player.

The placement area setting section 234 sets the placement area 12 using the basic area 13 and the element area 14, the placement area 12 being an area in which the enemy character 7 can be disposed so that the AR marker 10 is rarely lost with respect to each game-participating device. In the first embodiment, an overlapping area of the basic area 13 and each element area 14 is calculated to be the placement area 12.

The NPC control section 235 controls placement of a non-player character (NPC) (e.g., enemy character 7), an effect object (e.g., flying object 6), and a background object that forms the background of the game space. The NPC control section 235 performs an AI control process. Historical information about control information (e.g., position coordinates, posture, and motion control data) about each object (e.g., NPC) for a given period (e.g., several frames (game images)) is linked to each object, and stored in an enemy character placement information queue 544 included in the play data 541 stored in the storage section 500 (see FIG. 11). The NPC control section 235 according to the first embodiment includes a start-up special control section 236 and a moving direction control section 237.

The start-up special control section 236 reduces the moving speed and/or the motion speed of the control target object for a given period (e.g., several frames (game images)) after the control process has started. Specifically, the start-up special control section 236 averages the previous control information stored in the enemy character placement information queue 544 and the calculated control information to obtain the actual control information.

For example, the control information value may jump at a timing at which the game device that functions as the host device has changed. It is possible to suppress an unnatural display (e.g., instantaneous movement of the object, or shift) at the change timing by utilizing the average value of the previous value and the latest value for the control process. The above measure is particularly effective for a change (e.g., shift) in display position of the object.

The moving direction control section 237 performs a process that determines the moving direction of the control target object based on the image position of the AR marker 10 within the image (live view image) captured by the imaging section 104, and a process that determines the moving direction of the control target object based on the relative position of the object within the placement area 12.

The former process controls the movement of the enemy character 7 (object) so that the enemy character 7 approaches the image position of the AR marker 10 with high probability when the image position of the AR marker 10 within the image (live view image) captured by the game device that functions as the host device is situated away from the center of the image. In other words, the movement (motion) of the enemy character 7 is controlled so that the enemy character 7 approaches the AR marker 10 when the viewpoint direction of the player (i.e., the optical axis direction of the CCD camera module 1516 or the line-of-sight direction of the virtual camera) is positioned away from the AR marker 10. Specifically, the moving direction of the enemy character 7 is determined so that the enemy character 7 approaches the AR marker 10 when the angle formed by the direction from the player (game device) to the AR marker 10 and the viewpoint direction of the player is large. For example, when determining the moving direction or the moving target point using a lottery process, the lottery probability may be temporarily changed, or the lottery process may be performed again when the moving direction or the moving target point determined by the lottery process does not approach the AR marker 10.

For example, the moving direction control section 237 performs a process that selects the moving direction of the enemy character 7 so that the enemy character 7 does not leave the placement area 12 when the enemy character 7 is situated within the placement area 12, or a process that calculate the distance from the contour of the placement area 12, and temporarily reduces the moving amount of the enemy character 7 when it has been detected that a given approach condition is satisfied. When the enemy character 7 is situated outside the placement area 12, the moving direction control section 237 performs a process that selects the moving direction of the enemy character 7 so that the enemy character 7 enters the placement area 12, or a process that temporarily increases the moving amount of the enemy character 7 so that the enemy character 7 promptly enters the placement area 12, for example.

The NPC information transmission control section 240 transmits NPC control information calculated by the NPC control section 235 to the other game device.

The area setting section 231, the NPC control section 235, and the NPC information transmission control section 240 are functional sections that operate only when the game device functions as the host device, and form the host function execution control section 249.

Again referring to FIG. 11, the sound generation section 250 is implemented by a processor (e.g., digital signal processor (DSP) or sound synthesis IC), an audio codec that can reproduce (replay) a sound file, and the like. The sound generation section 250 generates sound signals of a game effect sound, background music (BGM), and an operation sound based on the processing results of the game calculation section 202, and outputs the generated sound signals to the sound output section 350.

The sound output section 350 is implemented by a device that outputs a game effect sound, BGM, a telephone voice, and the like based on the sound signals input from the sound generation section 250. The speaker 1510 illustrated in FIG. 1 corresponds to the sound output section 350.

The image generation section 260 is implemented by a processor (e.g., GPU or a digital signal processor (DSP)), a video signal IC, a program (e.g., video codec), a drawing frame IC memory (e.g., frame buffer), a texture data decompression IC memory, and the like. The image generation section 260 generates a game screen (image) every frame (e.g., every 1/60th of a second) based on the processing results of the game calculation section 202, and outputs image signals of the generated game screen (image) to the image display section 360.

The image display section 360 displays a game image based on the image signals input from the image generation section 260. The image display section 360 may be implemented by an image display device such as a flat panel display, a cathode-ray tube (CRT), a projector, or a head-mounted display. The touch panel 1506 illustrated in FIG. 1 corresponds to the image display section 360.

The communication control section 270 performs a data communication process to exchange data with an external device through the communication section 370.

The communication section 370 connects to the communication line 1 to implement communication. The communication section 370 may be implemented by a transceiver, a modem, a terminal adapter (TA), a jack for a communication cable, a control circuit, and the like. The wireless communication module 1553 illustrated in FIG. 1 corresponds to the communication section 370.

The positioning control section 280 performs a control process (i.e., positioning calculation process and positioning calculation result management process) that calculates position information from a signal obtained from a positioning system through the positioning signal reception section 380. The GPS module 1554 illustrated in FIG. 1 corresponds to the positioning control section 280. When utilizing known position information about a mobile phone base station for the positioning calculation process, the wireless communication module 1553 that performs wireless communication with the base station also corresponds to the positioning signal reception section 380.

The storage section 500 stores a program, data, and the like that implement functions that cause the processing section 200 to integrally control the game device 1500. The storage section 500 is used as a work area for the processing section 200, and temporarily stores the results of calculations performed by the processing section 200 according to a program, data input from the operation section 100, and the like. The function of the storage section 500 is implemented by an IC memory (e.g., RAM and ROM), a magnetic disk (e.g., hard disk), an optical disk (e.g., CD-ROM and DVD), or the like. The IC memory included in the control board 1550 and the memory card 1540 illustrated in FIG. 1 correspond to the storage section 500.

The storage section 500 according to the first embodiment stores a system program 502 and a game program 504.

The system program 502 implements the basic functions of the game device 1500 as a computer.

The game program 504 causes the processing section 200 to implement the functions of the game calculation section 202. The game program 504 is stored in the memory card 1540 in advance. Note that the game program 504 may be downloaded from a given server before starting the game.

The storage section 500 stores game space initial setting data 510, character initial setting data 511, AR marker registration data 512, and depth function setting data 514 in advance. The game space initial setting data 510, the character initial setting data 511, the AR marker registration data 512, and the depth function setting data 514 are stored in the memory card 1540 in advance. Note that the game space initial setting data 510, the character initial setting data 511, the AR marker registration data 512, and the depth function setting data 514 may be downloaded from a given server before the game starts.

The storage section 500 stores a game-participating device registration data 520, an information queue 530, a current position 537, a current posture 538, play data 541, virtual three-dimensional space data 560, and a host function succession timing 562 as data that is generated during the game process, and updated at any time. The storage section 500 also stores data (e.g., decompressed texture data, elapsed time, timer value, counter, and flag) that is required when performing various processes, for example.

The game space initial setting data 510 is initial setting data that defines the background object that forms the background (stage) of the game. The game space initial setting data 510 includes model data, texture data, placement position data, and the like relating to the background object.

The character initial setting data 511 includes initial setting data relating to the game characters such as the player characters PC1 to PC3 and the enemy character 7. The initial values of model data, texture data, motion data, and ability parameter (e.g., attack capability, defense capability, and HP) are stored corresponding to each character.

Figures 13, 14:
FIG. 13 is a view illustrating a data configuration example of AR marker registration data.
FIG. 14 is a view illustrating a data configuration example of game-participating device registration data.

The AR marker registration data 512 is registration data relating to the AR marker that can be used in the game, and is stored corresponding to each type of AR marker. As illustrated in FIG. 13, the AR marker registration data 512 includes a marker type, a marker category, design pattern data, card dimensions, a basic area model (i.e., a model of the basic area 13), and a basic length-applied dimension that indicates a dimension to which the basic length Lb is applied.

The depth function setting data 514 is data that sets a function for calculating the depth Db of the element area 14, and is provided corresponding to each marker category of the AR marker 10 (see FIG. 7).

The game-participating device registration data 520 is data relating to registration of the game devices that participate in the game, and is generated by the participation process. As illustrated in FIG. 14, the game-participating device registration data 520 includes a game device ID 521, address information 522 for specifying the communication connection target, a host priority 523, a player character type 524, a marker recognition state 525, and a host function flag 526 that indicates whether or not the game device functions as the host device.

The game-participating device registration data 520 is generated by the host device during the game participation process, and distributed to each guest device.

The information queue 530 stores a given number of pieces of information about the position, the posture, and the like of the game device with respect to the AR marker 10. For example, the information queue 530 stores a calculation time 532, a relative position 533, a relative posture 534, and a relative distance 535.

The current position 537 is a weighted average of the relative positions 533 stored in the information queue 530, and the current posture 538 is a weighted average of the current postures 534 stored in the information queue 530.

The play data 541 is data that is generated and managed by the host function, and includes various types of data that indicates the game status. In the first embodiment, the play data 541 includes player character state data 542, enemy character state data 543, enemy character placement information queue 544, flying object placement data 545, basic area setting data 550, element area setting data 552, and placement area setting data 554.

The player character state data 542 includes data that indicates the state of each of the player characters PC1 to PC3, such as the current ability value (e.g., HP (hit point)), identification information about the applied motion data, motion control data, and the like.

The enemy character state data 543 includes data that indicates the state of the enemy character 7. For example, the enemy character state data 543 includes the current ability value (e.g., HP (hit point)), identification information about the applied motion data, motion control data, and the like.

The enemy character placement information queue 544 stores a given number of pieces of information (linked to the calculation time) about the position and the posture of the enemy character 7 in the CG space.

The flying object placement data 545 includes information that indicates the state (e.g., position, posture, speed, and acceleration) of each launched flying object.

The basic area setting data 550 includes the latest definition data relating to the basic area 13.

The element area setting data 552 includes the latest definition data relating to the element area 14 that is calculated corresponding to each game-participating device (i.e., the viewpoint position of each player).

The placement area setting data 554 includes the latest information about the placement area 12.

The virtual three-dimensional space data 560 includes placement information about various objects (e.g., player characters PC1 to PC3, enemy character 7, flying object 6, and background object) disposed in the virtual three-dimensional space.

The host function succession timing 562 includes information (e.g., system time) about the timing at which the game device that functions as the host device has changed. Specifically, the host function succession timing 562 includes information about the timing at which another game device has succeeded the host function.

Flow of Process

The flow of each process according to the first embodiment is described below with reference to FIGS. 17 to 24. The process described below is implemented by causing the game device 1500 to read the system program 502, the game program 504, and various types of setting data, and execute the system program 502 and the game program 504. Note that the AR marker 10 is disposed on the table 9 or the like in advance, and each player holds the game device 1500, and captures the AR marker 10 using the CCD camera module 1516.

Figure 17:
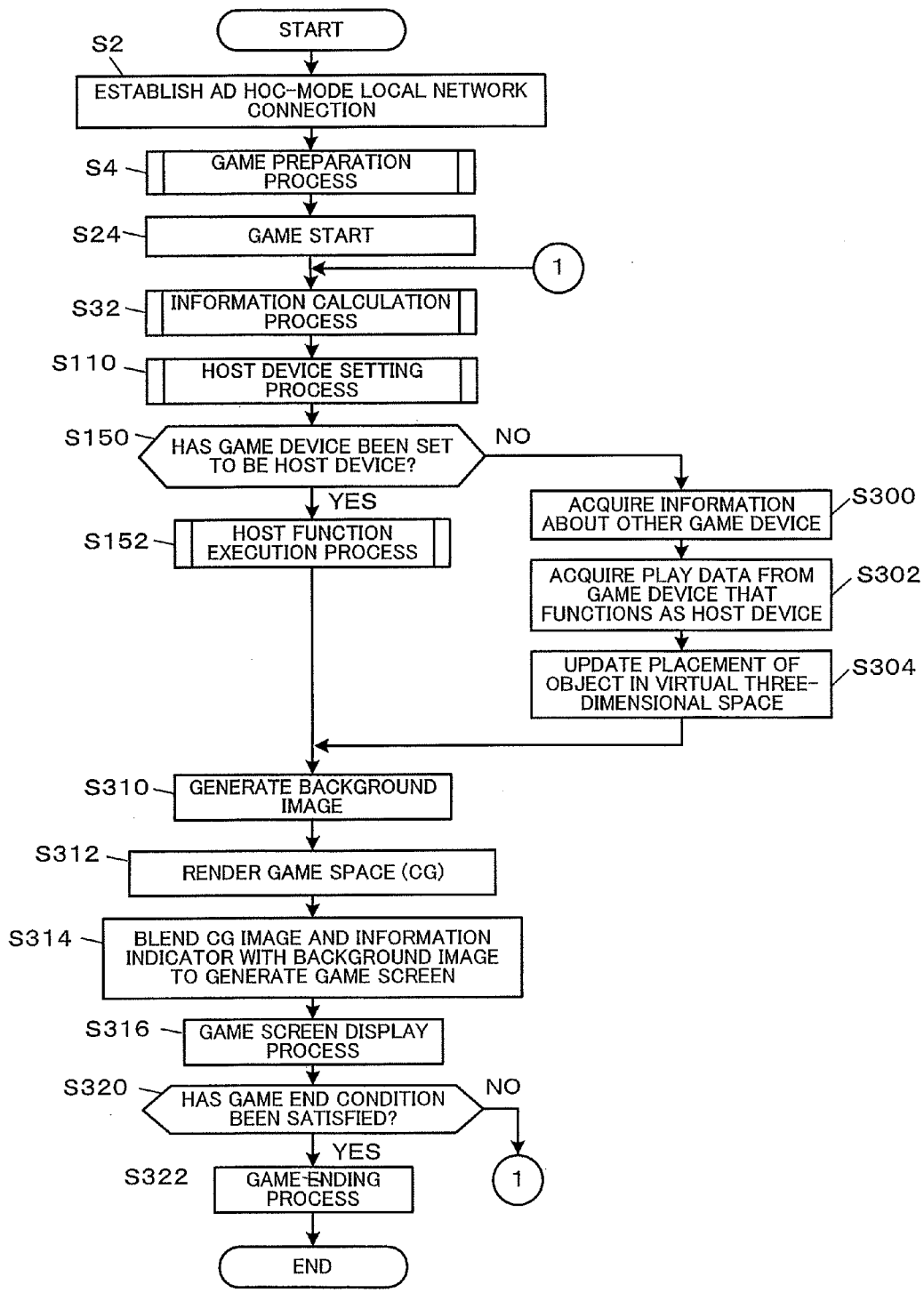
FIG. 17 is a flowchart illustrating the flow of the main process according to the first embodiment.

FIG. 17 is a flowchart illustrating the flow of the main process according to the first embodiment. The processing section 200 of the game device 1500 establishes an ad hoc-mode communication connection with another game device (step S2). A peer-to-peer (P2P) local network is thus formed between the game devices.

The processing section 200 executes a game preparation process (step S4).

Figure 18:
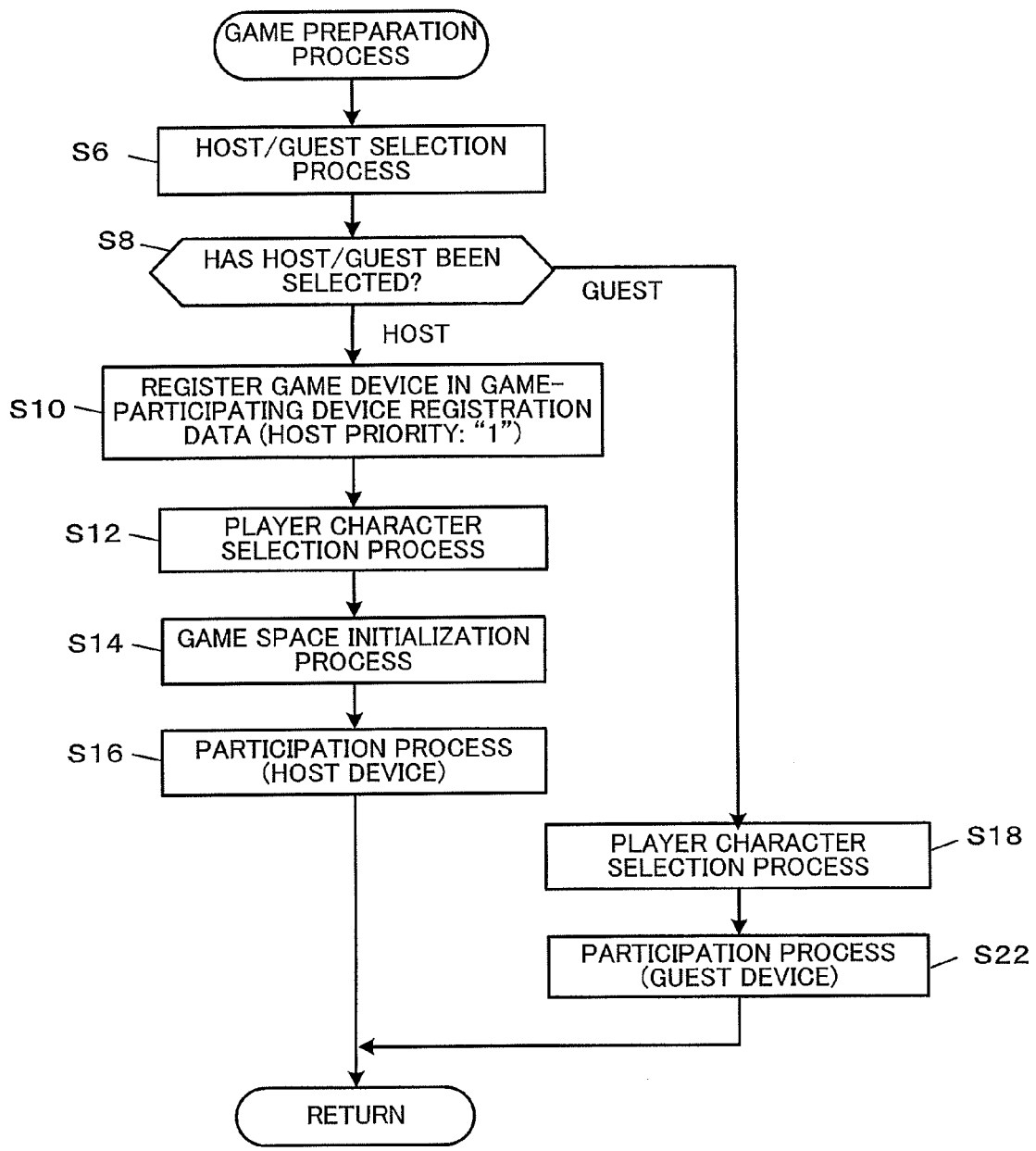
FIG. 18 is a flowchart illustrating the flow of a game preparation process.

FIG. 18 is a flowchart illustrating the flow of the game preparation process according to the first embodiment. The processing section 200 performs a host/guest selection process that displays a selection screen that allows the player to select whether to use the game device as the host device or the guest device (step S6).

When the player has selected to use the game device as the host device ("HOST" in step S8), the processing section 200 generates the game-participating device registration data 520 to register the game device (step S10). Specifically, the processing section 200 issues the game device ID 521, and stores the address information 522 within the local area network. The processing section 200 sets the host priority 523 to "1", and initializes the marker recognition state 525 to information that indicates the In Sight state ("1" in the example illustrated in FIG. 14).

The processing section 200 of the host device executes a player character selection process (step S12) and a game space initialization process (step S14).

The processing section 200 stores the player character selection result in the storage section 500 as the player character type 524 included in the game-participating device registration data 520.

The game space initialization process includes disposing the background object, the player character PC1, and the enemy character 7 in the virtual three-dimensional space (game space) referring to the game space initial setting data 510 and the character initial setting data 511. The player character state data 542 and the enemy character state data 543 are generated and initialized when the characters are disposed in the game space. The processing section 200 of the host device then performs the participation process (step S16).

When the player has selected to use the game device as the guest device ("GUEST" in step S6), the processing section 200 of the game device 1500 that functions as the guest device performs the player character selection processing (step S18), and transmits a game participation request signal to the host device to perform the participation process (step S22).

The processing section 200 of the host device appropriately exchanges information with the guest device that has transmitted the game participation request signal, and registers the guest device as a game-participating device. Specifically, the processing section 200 sets a new game device ID 521 (see the game-participating device registration data 520) to the guest device, registers the address information 522 about the guest device corresponding to the game device ID 521, and sets the host priority 523 of the guest device to "2". The player character type 524 is acquired from the guest device, and the marker recognition state 525 is set to a value that indicates the recognition state. When a given acceptance time has elapsed after the start of the participation process, the host device transmits the game-participating device registration data 520 to the guest device. The guest device stores the received game-participating device registration data 520 in the storage section 500.

After completion of the participation process, a step S24 in FIG. 17 is performed.

When the game has started (step S24), the processing section 200 repeatedly performs steps S32 to S320 in a given cycle until a game end condition is satisfied.

The processing section 200 performs an automatic information calculation process in one control cycle (step S32).

Figure 19:
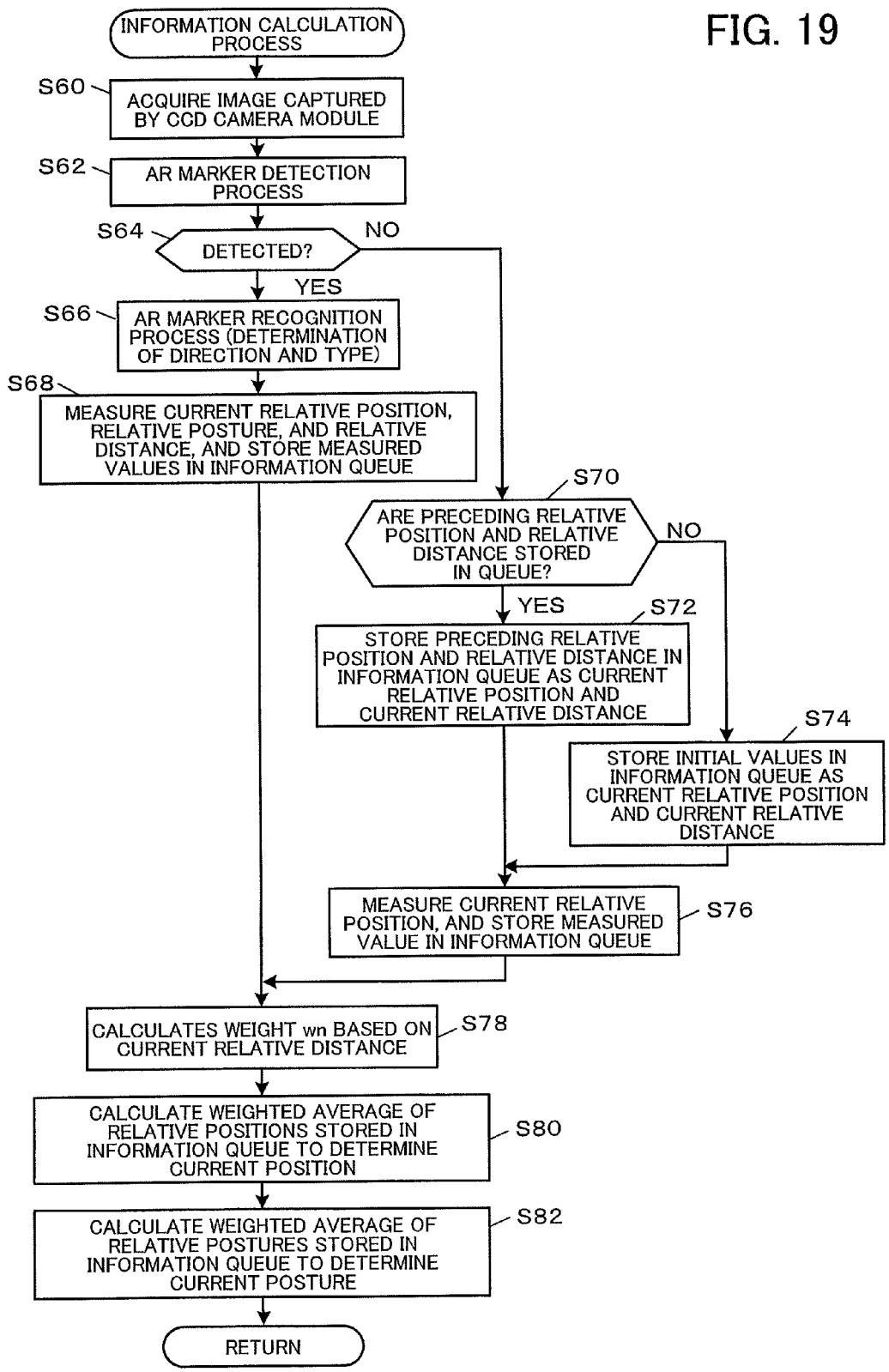
FIG. 19 is a flowchart illustrating the flow of an information calculation process.

FIG. 19 is a flowchart illustrating the flow of the automatic information calculation process. The processing section 200 acquires the image captured by the imaging section 104 (step S60), and performs an AR marker detection process (step S62).

When the AR marker 10 has been detected (YES in step S64), the processing section 200 determines the type and the like of the AR marker 10 (step S66). Specifically, the area of the AR marker is detected, and compared with the design pattern registered as the AR marker registration data 512 (see FIG. 13) in the same manner as in known marker-based AR technology to determine the direction, type, and category of the AR marker 10.

The processing section 200 then measures and calculates the relative position (Xc, Yc, Zc), the relative posture ($\omega p$, $\omega y$, $\omega r$), and the relative distance L with respect to the AR marker 10 (step S68). The calculation results are stored in the information queue 530.

When the AR marker 10 has not been detected (NO in step S64), the processing section 200 refers to the preceding relative position 533 and the preceding relative distance 535 stored in the information queue 530 instead of calculating the relative position, the relative posture, and the like.

When the preceding relative position 533 and the preceding relative distance 535 are stored in the information queue 530 (YES in step S70), the processing section 200 copies the preceding relative position 533 and the preceding relative distance 535, and stores them in the information queue 530 as the current relative position and the current relative distance (step S72). When the preceding relative position 533 and the preceding relative distance 535 are not stored in the information queue 530 (No in step S70), the processing section 200 stores given initial values in the information queue 530 as the current relative position and the current relative distance (step S74).

The processing section 200 stores the relative posture measured based on the detection result of the posture detection section 108 in the information queue 530 irrespective of whether or not the preceding relative posture is stored in the information queue 530 (step S76).

The processing section 200 then calculates the weight wn (n is the order of data stored in the information queue 530) (step S78), and calculates a weighted average of the relative positions 533 stored in the information queue 530 using the calculated weight wn to calculate the current position 537 (step S80).

The processing section 200 calculates a weighted average of the relative postures 534 stored in the information queue 530 to calculate the current posture 538 (step S82). Note that the weight wn used to calculate the weighted average is calculated using the given function h(n, Lc) and the latest relative distance Lc. The information calculation process ends when the weight wn has been calculated.

Again referring to FIG. 17, the processing section 200 then performs a host device setting process (step S110).

Figure 20:
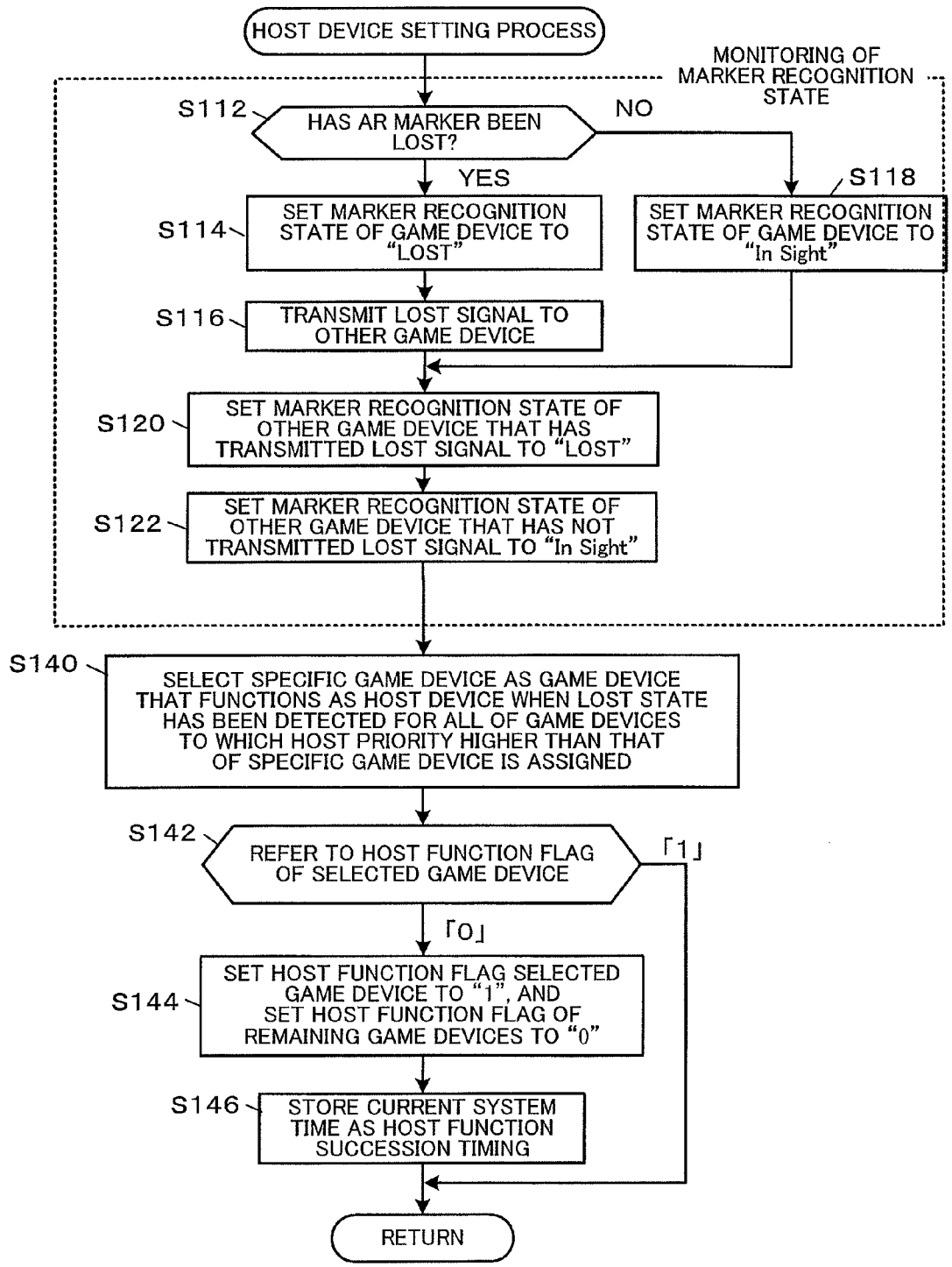
FIG. 20 is a flowchart illustrating the flow of a host device setting process.

FIG. 20 is a flowchart illustrating the flow of the host device setting process according to the first embodiment.

The processing section 200 monitors the recognition state of the AR marker 10 by each game device (steps S112 to S122).

Specifically, when the AR marker 10 could not be recognized by the information calculation process (YES in step S112), the processing section 200 sets the marker recognition state 525 stored as the game-participating device registration data 520 (see FIG. 14) to "LOST" (step S114), and transmits a given LOST signal to the other game device (step S116). When the AR marker 10 has been recognized (NO in step S112), the processing section 200 sets the marker recognition state 525 to "In Sight" (step S118).

When the LOST signal has been received from the other game device, the processing section 200 sets the marker recognition state 525 of the other game device that has transmitted the LOST signal to "LOST" (step S120). The processing section 200 sets the marker recognition state 525 of the other game device that has not transmitted the LOST signal to "In Sight" (step S122). The marker recognition state of each game-participating device is thus updated.

The processing section 200 then selects the game device that functions as the host device based on the marker recognition state monitoring results (step S140).

Specifically, the processing section 200 refers to the marker recognition state 525 stored as the game-participating device registration data 520. When the LOST state has been detected for all of the game devices to which a host priority higher than that of a specific game device is assigned, the processing section 200 selects the specific game device as the game device that functions as the host device.

The processing section 200 refers to the host function flag 526 of the selected game device. When the host function flag 526 is set to "0" ("0" in step S142), the processing section 200 sets the host function flag 526 of the remaining game devices to "0" (step S144), stores the current system time as the host function succession timing 562 (step S146), and terminates the host device setting process. When the host function flag 526 of the selected game device is set to "1" ("1" in step S142), the processing section 200 terminates the host device setting process without performing the flag operation and update of the host function succession timing 562.

Again referring to FIG. 17, when the game device has been set to be the host device (YES in step S150), the processing section 200 determines that the game device should function as the host device, and performs a host function execution process (step S152).

Figure 21:
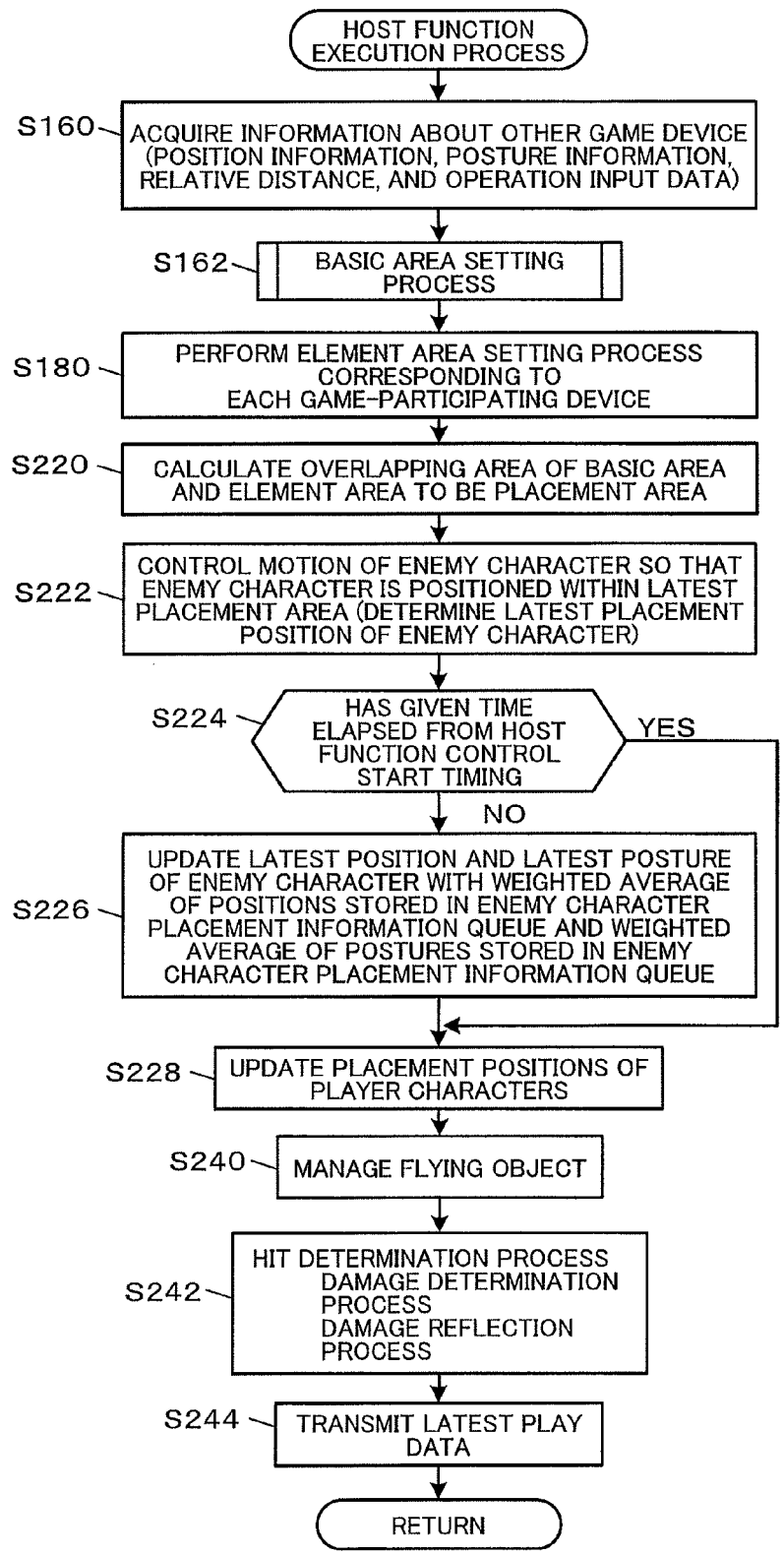
FIG. 21 is a flowchart illustrating the flow of a host function execution process.

FIG. 21 is a flowchart illustrating the flow of the host function execution process according to the first embodiment. The processing section 200 acquires the current position 537, the current posture 538, and operation input data (e.g., the presence or absence of a shooting operation input) from the other game device as information about the other game device (step S160). The processing section 200 then performs a basic area setting process (step S162).

Figure 22:
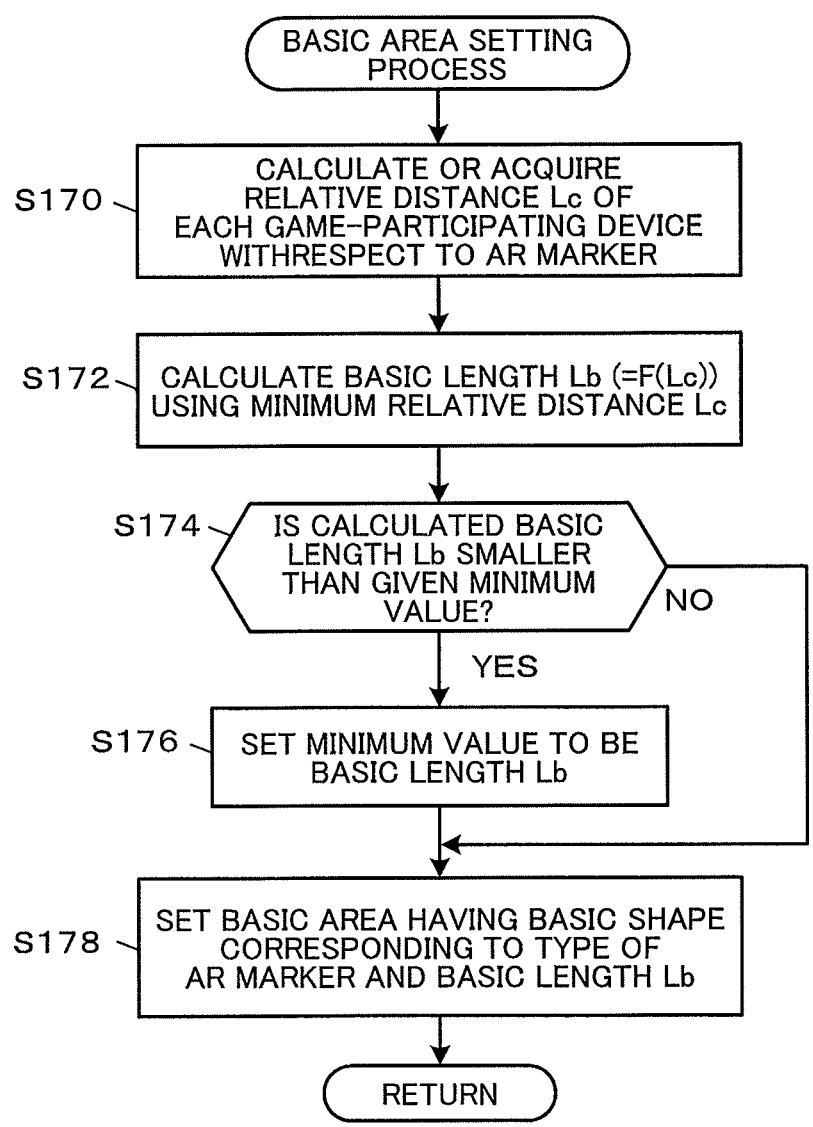
FIG. 22 is a flowchart illustrating the flow of a basic area setting process.

FIG. 22 is a flowchart illustrating the flow of the basic area setting process according to the first embodiment. The processing section 200 calculates or acquires the relative distance Lc of each game-participating device (viewpoint of each player) with respect to the AR marker 10 (step S170), and calculates the basic length Lb based on the calculated or acquired relative distance Lc (step S172). In the first embodiment, the basic length Lb is calculated using a given function f(Lc) and a minimum value among the relative distances Lc calculated corresponding to the respective game-participating devices.

The processing section 200 compares the calculated basic length Lb with a given minimum value. When the calculated basic length Lb is less than the minimum value (YES in step S174), the processing section 200 sets the minimum value to be the basic length Lb (step S176). The processing section 200 reads the basic area model from the AR marker registration card 512 (see FIG. 13) corresponding to the type and the category of the recognized AR marker (see the step S66 in FIG. 19), and sets the basic area 13 using the basic length Lb as the basic length-applied dimension (step S178). Information (e.g., vertex coordinate/contour function) that defines the basic area 13 is stored as the basic area setting data 550 included in the play data 541. The processing section 200 thus completes the basic area setting process.

Again referring to FIG. 21, the processing section 200 performs an element area setting process corresponding to each game-participating device, and sets the element area 14 corresponding to the viewpoint of each player (step S180).

Figure 23:
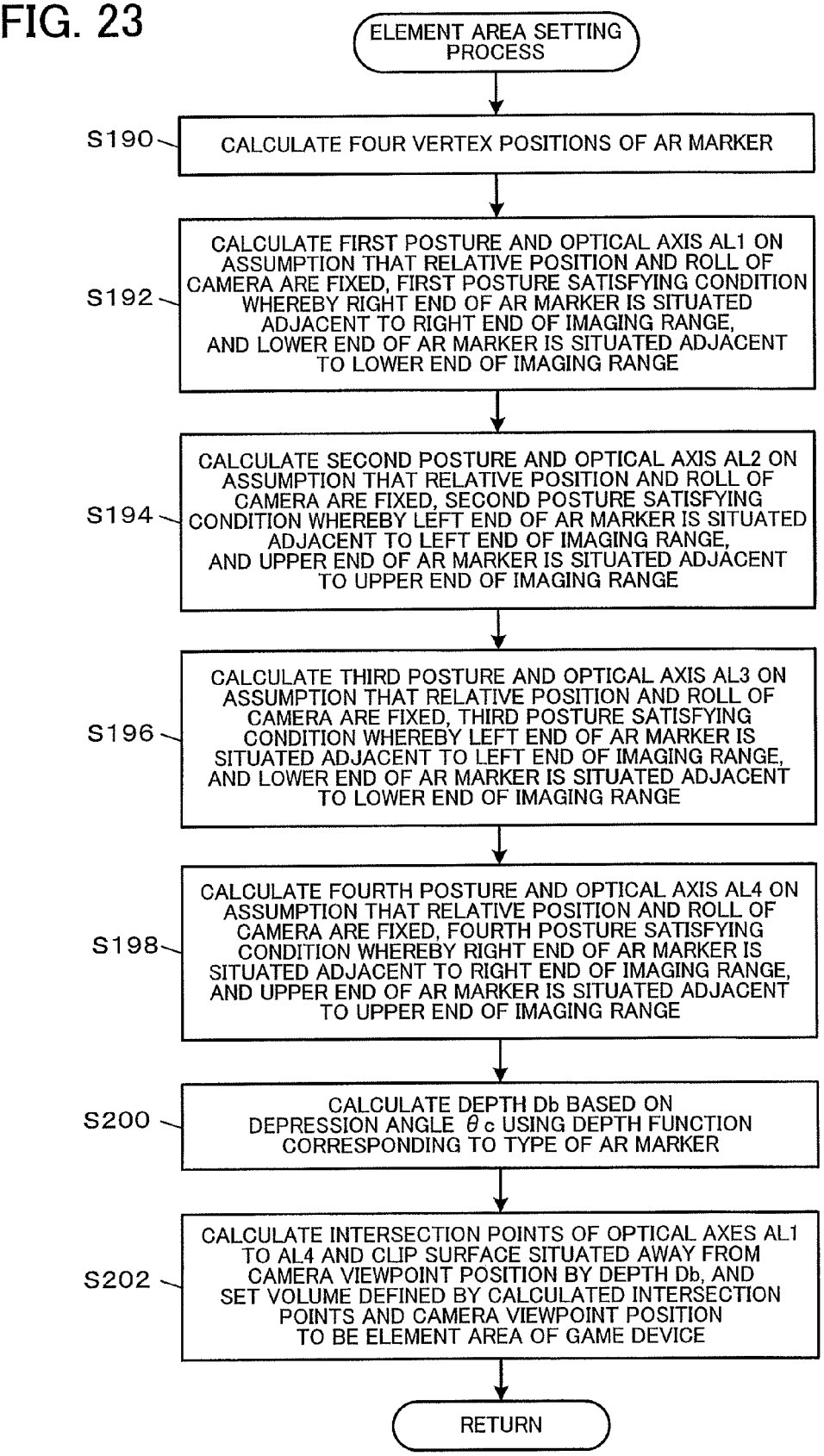
FIG. 23 is a flowchart illustrating the flow of an element area setting process.

FIG. 23 is a flowchart illustrating the flow of the element area setting process. The processing section 200 calculates the vertex positions of the AR marker 10 within the acquired (captured) image (step S190). The processing section 200 calculates the first posture and the optical axis AU of the CCD camera module 1516 corresponding to the first posture on the assumption that the position and the roll of the game device 1500 (i.e., the position and the roll (rotation around the optical axis) of the CCD camera module 1516) are fixed, the first posture satisfying a condition whereby the right end of the AR marker 10 is situated adjacent to the right end of the imaging range of the CCD camera module 1516, and the lower end of the AR marker 10 is situated adjacent to the lower end of the imaging range of the CCD camera module 1516 (step S192; see FIG. 6).

Likewise, the processing section 200 calculates the second posture and the optical axis AL2 corresponding to the second posture (i.e., the left end of the AR marker 10 is situated adjacent to the left end of the imaging range of the CCD camera module 1516, and the upper end of the AR marker 10 is situated adjacent to the upper end of the imaging range of the CCD camera module 1516) (step S194), calculates the third posture and the optical axis AL3 corresponding to the second third (i.e., the left end of the AR marker 10 is situated adjacent to the left end of the imaging range of the CCD camera module 1516, and the lower end of the AR marker 10 is situated adjacent to the lower end of the imaging range of the CCD camera module 1516) (step S196), and calculates the fourth posture and the optical axis AL4 corresponding to the fourth posture (i.e., the right end of the AR marker 10 is situated adjacent to the right end of the imaging range of the CCD camera module 1516, and the upper end of the AR marker 10 is situated adjacent to the upper end of the imaging range of the CCD camera module 1516) (step S198).

The processing section 200 calculates the angle of the optical axis (i.e., depression angle $\theta c$) of the CCD camera module 1516 with respect to the design surface (marker plane) of the AR marker 10. The processing section 200 selects or refers to the depth function setting data 514 corresponding to the category of the AR marker 10, and calculates the depth Db based on the calculated depression angle $\theta c$ (step S200).

The processing section 200 calculates the intersection points of the optical axes AL1 to AL4 and a clip surface that is situated away from the camera viewpoint position of the CCD camera module 1516 by the depth Db in the current optical axis direction, and sets a volume defined by the calculated four intersection points and the camera viewpoint position to be the element area 14 of the target game device 1500 (i.e., the viewpoint of the target player) (step S202). Information (e.g., vertex coordinate/contour function) that defines the element area 14 is stored as the element area setting data 552 included in the play data 541. The processing section 200 thus completes the element area setting process.

Again referring to FIG. 21, the processing section 200 calculates an overlapping area of the basic area 13 and the element area 14 to be the placement area 12 (step S220). Information (e.g., vertex coordinate/contour function) that defines the overlapping area is stored as the placement area setting data 554 included in the play data 541.

The processing section 200 then controls the motion of the enemy character 7 so that the enemy character 7 is positioned within the range of the latest placement area 12 (step S222).

The processing section 200 controls the movement and the attack motion of the enemy character 7.

For example, the processing section 200 performs a process that selects the moving direction of the enemy character 7 so that the enemy character 7 does not leave the placement area 12 when the enemy character 7 is situated within the placement area 12, a process that calculate the distance from the contour of the placement area 12, and temporarily reduces the moving amount of the enemy character 7 when it has been detected that a given approach condition is satisfied, and the like to determine the placement position of the enemy character 7. When the enemy character 7 is situated outside the placement area 12, the processing section 200 performs a process that selects the moving direction of the enemy character 7 so that the enemy character 7 enters the placement area 12, a process that temporarily increases the moving amount (moving speed) of the enemy character 7, and the like to determine the placement position of the enemy character 7.

The processing section 200 controls the movement of the enemy character 7 so that the enemy character 7 approaches the image position of the AR marker 10 with high probability when the image position of the AR marker 10 within the image (live view image) captured by the imaging section 104 is situated away from the center of the image. In other words, the processing section 200 controls the movement (motion) of the enemy character 7 so that the enemy character 7 approaches the AR marker 10 when the viewpoint direction of the player (i.e., the optical axis direction of the CCD camera module 1516 or the line-of-sight direction of the virtual camera) is positioned away from the AR marker 10.

For example, when determining the moving direction of the enemy character 7 using a lottery process, the lottery probability may be temporarily changed so that the current moving direction toward the AR marker 10 is selected with high probability, or the lottery process may be performed again when the moving direction determined by the lottery process does not coincide with the line-of-sight direction.

The position and the posture of the enemy character 7 determined as described above are stored in the enemy character placement information queue 544. The control data relating to the enemy character 7 (object) included in the virtual three-dimensional space data 560 is appropriately rewritten along with movement control.

The processing section 200 controls the attack motion of the enemy character 7 so that the enemy character 7 shoots an appropriate player character among the player characters PC1 to PC3 at an appropriate timing using a given algorithm (AI control).

The processing section 200 compares the current system time with the system time (i.e., the host function control start timing) stored as the host function succession timing 562 to determine whether or not a given time has elapsed from the host function control start timing.

When the given time has not elapsed from the host function control start timing (NO in step S224), the processing section 200 performs a start-up special control process that reduces the moving amount and/or the moving speed of the enemy character 7 (step S226).

For example, a weighted average (a smaller weight is applied to the previous value) of the positions stored in the enemy character placement information queue 544, and a weighted average (a smaller weight is applied to the previous value) of the postures stored in the enemy character placement information queue 544 are calculated, and the latest values stored in the enemy character placement information queue 544 are updated with the weighted averages. According to the above configuration, even when the position or the posture of the enemy character 7 significantly changes when the game device that functions as the host device has changed, the effects thereof can be reduced. Since the apparent moving amount or the apparent moving speed of the enemy character 7 can be reduced, it is possible to prevent an unnatural motion that occurs when the moving amount or the moving speed instantaneously increases.

When the given time has elapsed from the host function control start timing (YES in step S224), the start-up special control process is skipped.

The processing section 200 then updates the placement positions of the player characters PC1 to PC3 (step S228). The control data relating to the player characters PC1 to PC3 (objects) included in the virtual three-dimensional space data 560 is appropriately rewritten along with the above process.

The processing section 200 then manages the flying object 6 (step S240). For example, when the enemy character 7 has made an attack motion, or an attack operation input has been detected by an arbitrary game device, a new flying object 6 launched from the corresponding player character is disposed in the virtual three-dimensional space. The flying object 6 that has been disposed in the virtual three-dimensional space is moved. The flying object placement data 545 stored in the play data 541, and the control data relating to the flying object 6 (object) stored in the virtual three-dimensional space data 560 are appropriately rewritten along with the above process.

The processing section 200 performs a hit determination process, a damage determination process, and a damage reflection process based on the position of the flying object 6 after movement, the updated positions of the player characters PC1 to PC3, and the position of the enemy character 7 (step S242). When it has been determined that the flying object 6 has hit the player character, the flying object 6 is deleted from the virtual three-dimensional space. The player character state data 542 and the enemy character state data 543 included in the play data 541 are updated by the damage reflection process.

Since one control cycle has completed by the above process, the processing section 200 transmits the latest play data 541 to the other game device (step S244), and terminates the host function execution process.

Again referring to FIG. 17, when the game device has not been set to be the host device (NO in step S150), the processing section 200 controls the game device to function as the guest device. Specifically, the processing section 200 of the guest device acquires the current position 537, the current posture 538, and the operation input information from the other game device (step S300), and acquires the play data from the host device (step S302). The processing section 200 updates the placement position of the object in the virtual three-dimensional space based on the acquired current position 537, the acquired current posture 538, the current position 537 of the game device, the current posture 538 of the game device, and the acquired play data (step S304).

The game control process and placement of the objects in the virtual three-dimensional space (CG space) corresponding to the result of the game control process are thus complete.

The processing section 200 then performs a game screen generation/display process. Specifically, the processing section 200 crops the image captured by the imaging section 104 to generate a background image (step S310). The processing section 200 disposes the virtual camera CM in the virtual three-dimensional space based on the current position 537 and the current posture 538 of the game device, and renders the state of the virtual three-dimensional space captured by the virtual camera (step S312). The processing section 200 blends the resulting CG image with the background image, and blends an information indicator such as the cross hairs 8 at the center of the screen to generate the game screen (step S314). The processing section 200 displays the game screen on the image display section 360 (step S316; see FIG. 3).

The processing section 200 then determines whether or not the game end condition has been satisfied (step S320). When the game end condition has not been satisfied (NO in step S320), the processing section 200 starts the next control cycle. When the game end condition has been satisfied (YES in step S320), the processing section 200 performs a game ending process such as displaying an ending screen (step S322), and terminates the process.

According to the first embodiment, the display position of the character within the augmented reality space can be controlled appropriately for the multi-player game using the relative position of the viewpoint of each player with respect to the AR marker 10 (i.e., the relative position of the game-participating device (e.g., the relative position of the viewpoint of the CCD camera module 1516) with respect to the reference point of the AR marker 10).

Specifically, the placement position of the attention character (enemy character 7) can be adjusted so that the AR marker 10 does not lie outside the imaging range of the CCD camera module 1516 even if the viewpoint position and the line-of-sight direction of each game device 1500 have been changed to track the attention character. This makes it possible to improve the quality of a multi-player game that utilizes an augmented reality space, and prevent or suppress various problems that may occur due to character placement control.

According to the first embodiment, since the current position for controlling the virtual camera can be determined using the relative positions corresponding to a given time (or a given number), the effects of shake can be suppressed. When the AR marker 10 cannot be recognized, the position coordinates are temporarily fixed to the values immediately before the AR marker 10 has been lost, while the current posture is continuously calculated. In this case, the accuracy of matching between the coordinates of the real space and the coordinates of the CG space decreases as compared with the case where the AR marker 10 is recognized. However, it is possible to suppress a shift in display position of the character or the like that may make it difficult to continue the game. Specifically, it is possible to suppress a situation in which it is difficult to continue the game when the AR marker has been lost.

When a game-participating device that functions as the host device (that controls the NPC such as the enemy character 7) cannot recognize the AR marker 10, another game-participating device functions as the host device. This makes it possible to continue the game by suppressing a shift in display position of the NPC or the like that may occur when the AR marker 10 has been lost.

In the first embodiment, some of the elements may be appropriately changed or omitted, or other elements may be added.

The first embodiment has been described above taking an example in which the LOST signal is transmitted when the AR marker 10 cannot be recognized, and the marker recognition state is managed depending on the presence or absence of the LOST signal. Note that an In Sight signal may be transmitted when the AR marker 10 is recognized. The marker recognition state 525 of the game device that is transmitting the In Sight signal may be set to "In Sight" when the In Sight signal is received, and the marker recognition state 525 of the game device that is not transmitting the In Sight signal may be set to "LOST".

Figure 24:
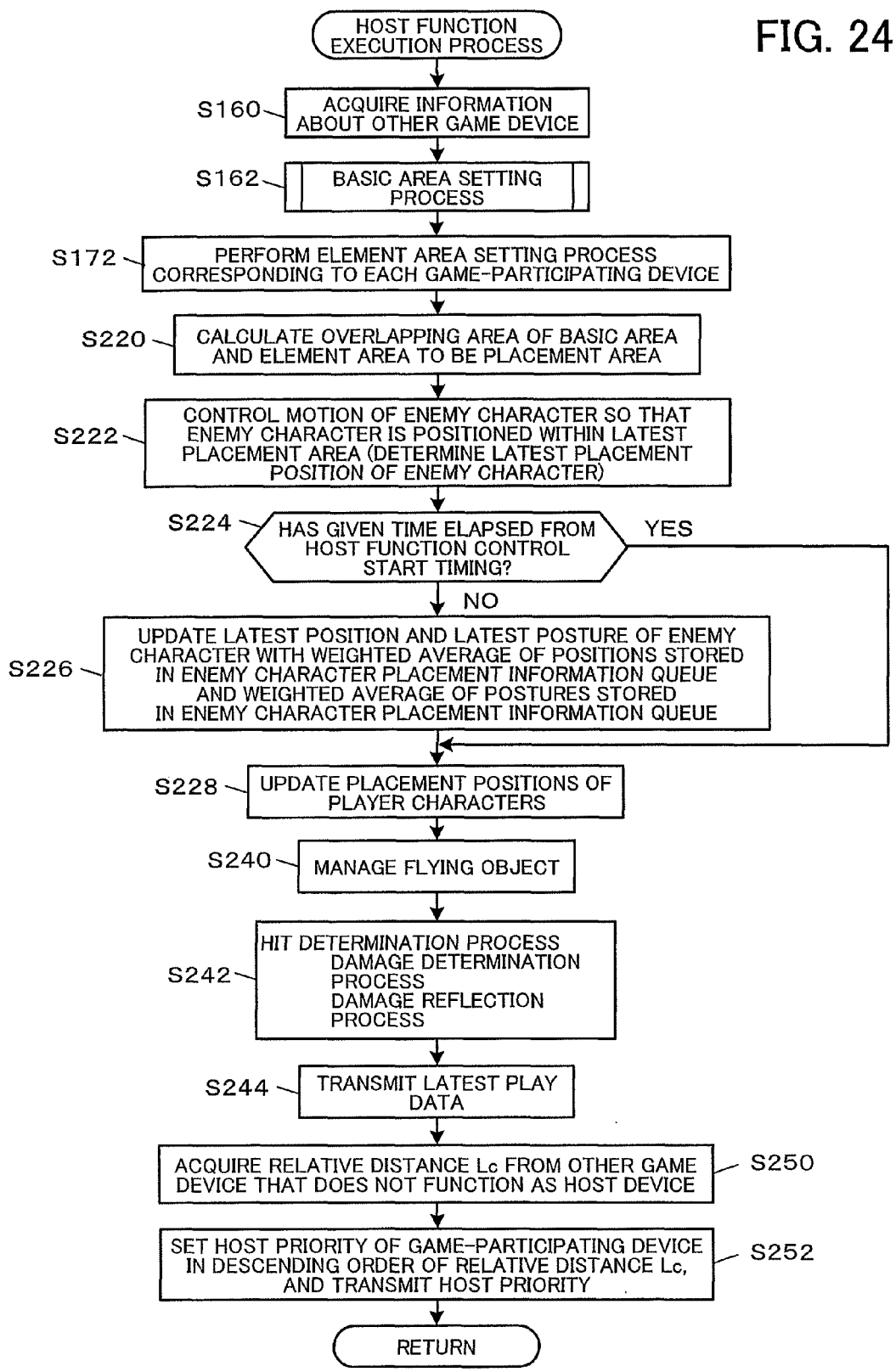
FIG. 24 is a flowchart illustrating the flow of a host function execution process.

The initial value of the host priority that has been set by the game preparation process maybe appropriately changed during the game. In FIG. 24 (host function execution process), the processing section 200 acquires the relative distance Lc with respect to the latest AR marker 10 from the other game device (step S250). The processing section 200 sorts the acquired relative distances Lc and the latest relative distance Lc of the game device in descending order, sets the host priority 523 in descending order of the relative distance Lc, and transmits the host priority 523 (step S252). Note that the processing section 200 of the game device 1500 that does not function as the host device updates the host priority 523 included in the game-participating device registration data 520 stored in the storage section 500 when a new host priority 523 has been received after the step S304 in FIG. 17 (see FIG. 17), for example.

Since the game device 1500 that is positioned away from the AR marker 10 can capture a wide range, it is expected that the AR marker 10 is not easily lost. Therefore, it is possible to prevent a situation in which the game device that functions as the host device frequently changes by setting the host priority 523 in descending order of the relative distance Lc.

Second Embodiment

A second embodiment is described below. The second embodiment is basically implemented in the same manner as the first embodiment, but differs from the first embodiment in that the multi-player game is implemented using a single game device that includes a plurality of handheld user terminals instead of a plurality of game devices. The same elements as those described above in connection with the first embodiment are indicated by identical reference signs, and detailed description thereof is omitted. The following description mainly focuses on the differences from the first embodiment.

Figure 25:
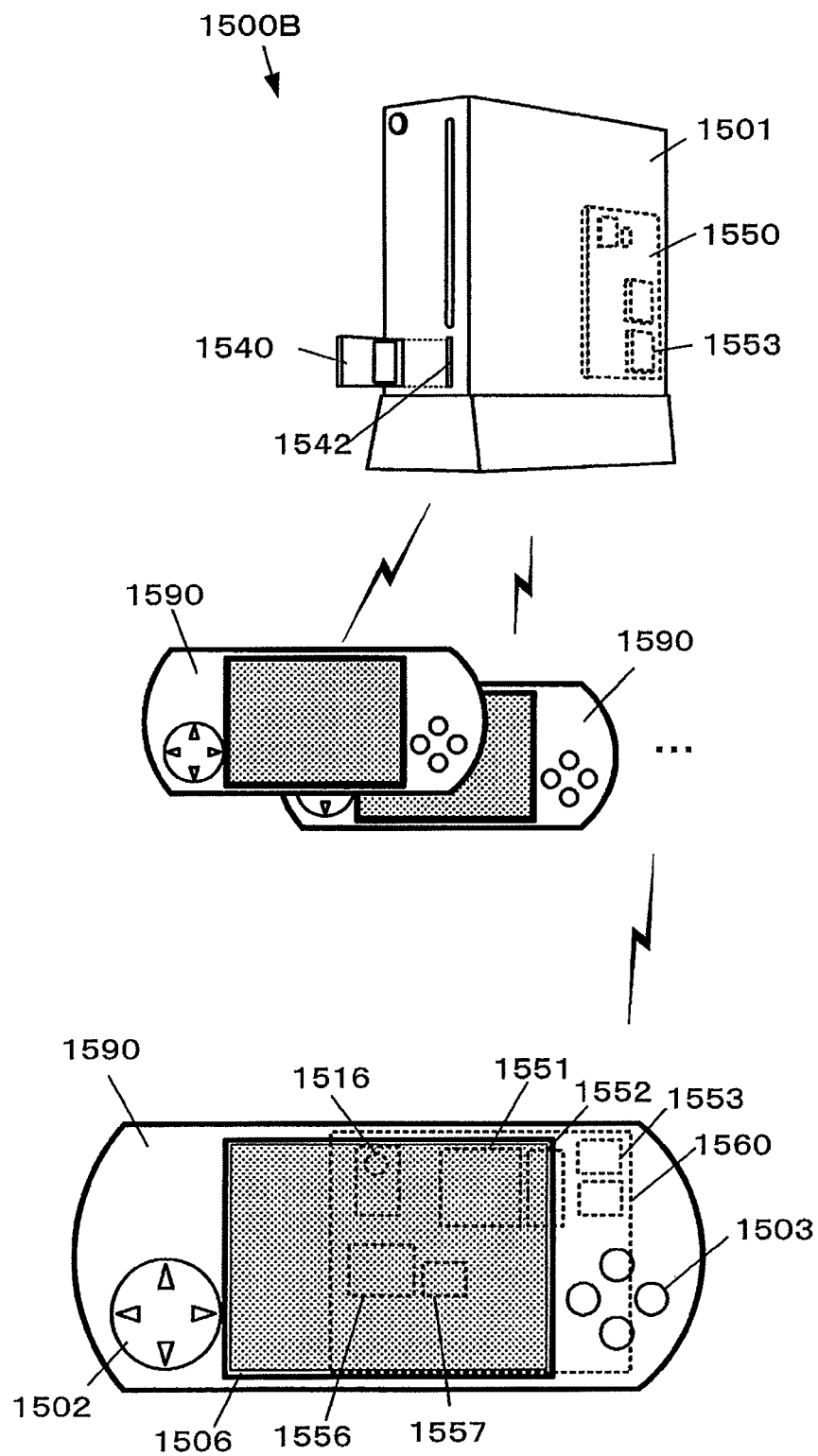
FIG. 25 is a view illustrating a configuration example of a game device according to a second embodiment.

FIG. 25 is a view illustrating a configuration example of a game device 1500B according to the second embodiment. The game device 1500B includes a game device main body 1501 that includes a control board 1550, and a plurality of wireless user terminals 1590. Each player carries one user terminal 1590 in the same manner as the game device 1500 described above in connection with the first embodiment, and plays the game while holding the user terminal 1590 toward the AR marker 10.

The user terminal 1590 is a wireless game controller. A CCD camera module 1516 is secured on the back side of the main body of the user terminal 1590 in the same manner as the game device 1500 described above in connection with the first embodiment so as to capture the rear side of the main body of the user terminal 1590. The user terminal 1590 includes a terminal control board 1560, a triaxial gyroscope 1556, an acceleration sensor 1557, and a wireless communication module 1553.

Image data captured by the CCD camera module 1516 of the user terminal 1590, and information detected by the triaxial gyroscope 1556 and the triaxial acceleration sensor 1557 are linked to terminal identification information, and transmitted to the game device main body 1501 via wireless communication through the wireless communication module 1553. The game device main body 1501 performs a game control process in the same manner as described above in connection with the first embodiment based on the received information. The game device main body 1501 generates a game screen corresponding to each user terminal 1590, and transmits image data for displaying the generated game screen to each user terminal 1590. Each user terminal 1590 displays an AR game screen on a touch panel 1506 based on the received image data.

Figure 26:
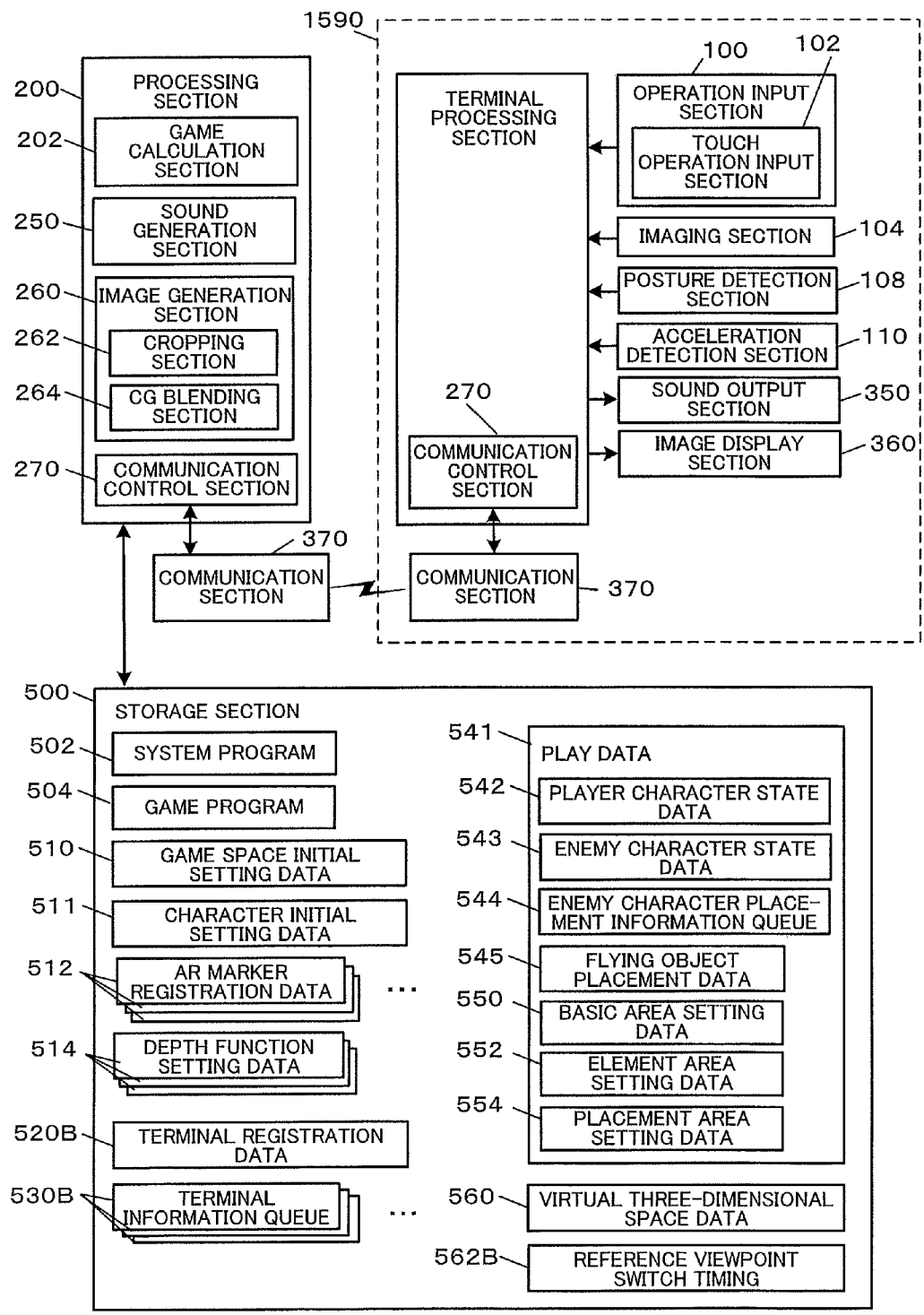
FIG. 26 is a functional block diagram illustrating a functional configuration example according to the second embodiment.
Figure 27:
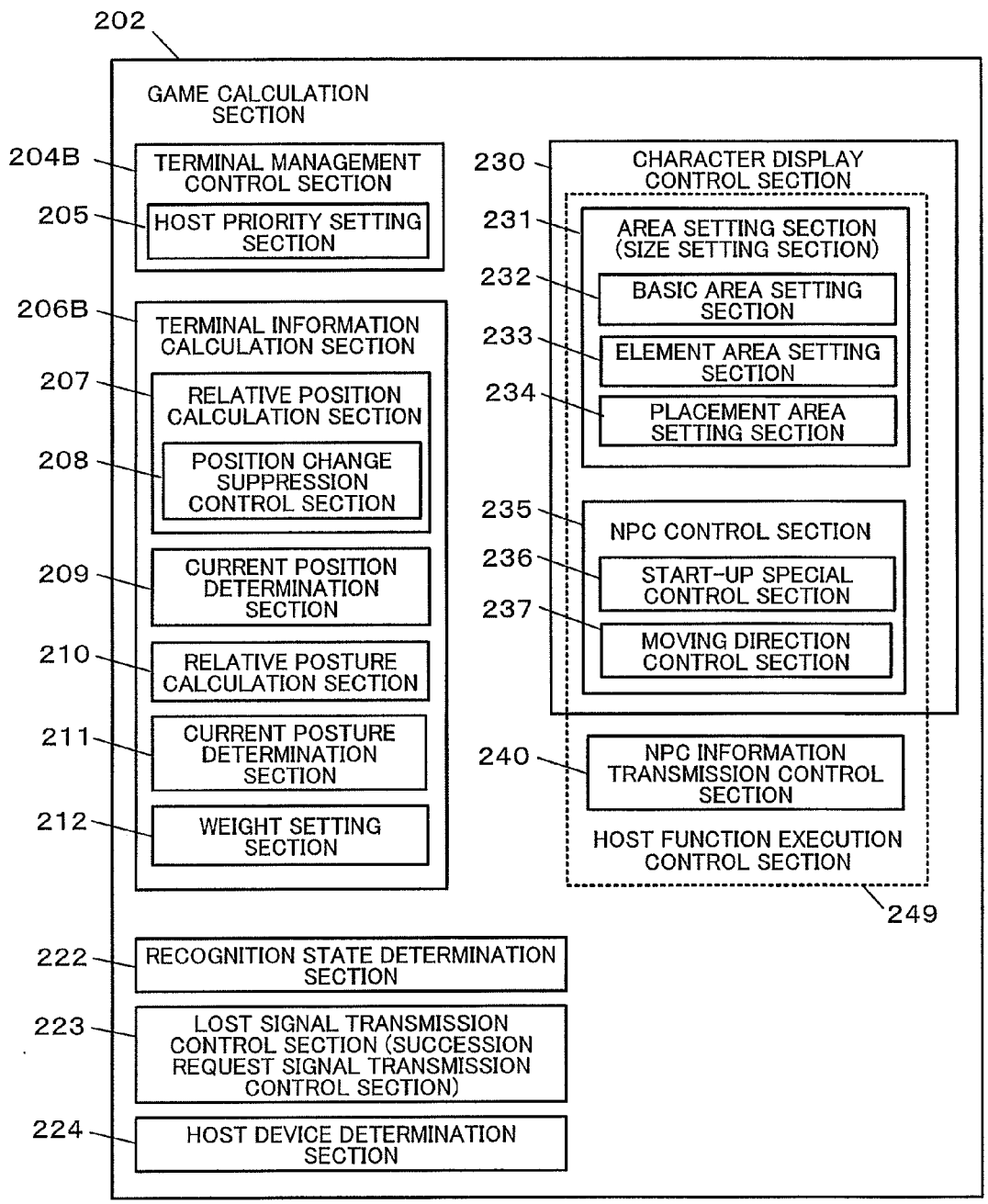
FIG. 27 is a functional block diagram illustrating a functional configuration example of a game calculation section according to the second embodiment.

FIG. 26 is a functional block diagram illustrating a functional configuration example according to the second embodiment. FIG. 27 is a functional block diagram illustrating a functional configuration example of a game calculation section according to the second embodiment.

The functional configuration according to the second embodiment is basically the same as the functional configuration according to the first embodiment, but differs from the functional configuration according to the first embodiment in that input and sound/image output are performed using the user terminal 1590. Note that each user terminal 1590 is not classified into the host device and the guest device. The functional sections according to the second embodiment are designed on the assumption that the user terminal 1590 does not function as either the host device or the guest device.

As illustrated in FIG. 27, a terminal management control section 204B that establishes communication connection between the user terminal 1590 and the game device main body 1501, and performs a terminal registration process for implementing communication in an ad hoc mode is provided instead of the game participation management control section 204 described above in connection with the first embodiment. A terminal information calculation section 206B is provided instead of the information calculation section 206 described above in connection with the first embodiment, and the information transmission control section 220 and the information reception control section 221 described above in connection with the first embodiment are omitted. In the second embodiment, the host device determination section 224 serves as a functional section that determines the user terminal 1590 whose camera is used as the reference viewpoint for controlling the enemy character 7.

As illustrated in FIG. 26, data stored in a storage section 500 is basically the same as the data described above in connection with the first embodiment, except for the following points.

The game-participating device registration data 520 described above in connection with the first embodiment is replaced with terminal registration data 520B. As illustrated in FIG. 28, the terminal registration data 520B includes a terminal ID 521B that is identification information about the user terminal 1590, address information 522, a reference viewpoint priority 523B (that replaces the host priority 523 described above in connection with the first embodiment), a player character type 524, a marker recognition state 525, and a reference viewpoint flag 527.

The reference viewpoint flag 527 is a flag that indicates whether or not the CCD camera module 1516 of the terminal is selected to be a viewpoint for controlling the NPC (e.g., enemy character 7).

A terminal information queue 530B that is included in each terminal is provided instead of the information queue 530 described above in connection with the first embodiment. As illustrated in FIG. 29, a calculation time 532, a relative position 533 of the user terminal with respect to the AR marker 10, a relative posture 534 of the user terminal with respect to the AR marker 10, and a relative distance 535 are stored in the terminal information queue 530B, for example. A terminal current position 537B and a terminal current posture 538B that respectively correspond to the current position 537 and the current posture 538 described above in connection with the first embodiment are also stored in the terminal information queue 530B.

In the second embodiment, since an arbitrary user terminal 1590 (CCD camera module 1516) is used as the reference viewpoint for controlling the enemy character 7 or the like, a reference viewpoint switch timing 562B is stored in the storage section 500 instead of the host function succession timing 562 described above in connection with the first embodiment (see FIG. 26).

Figure 30:
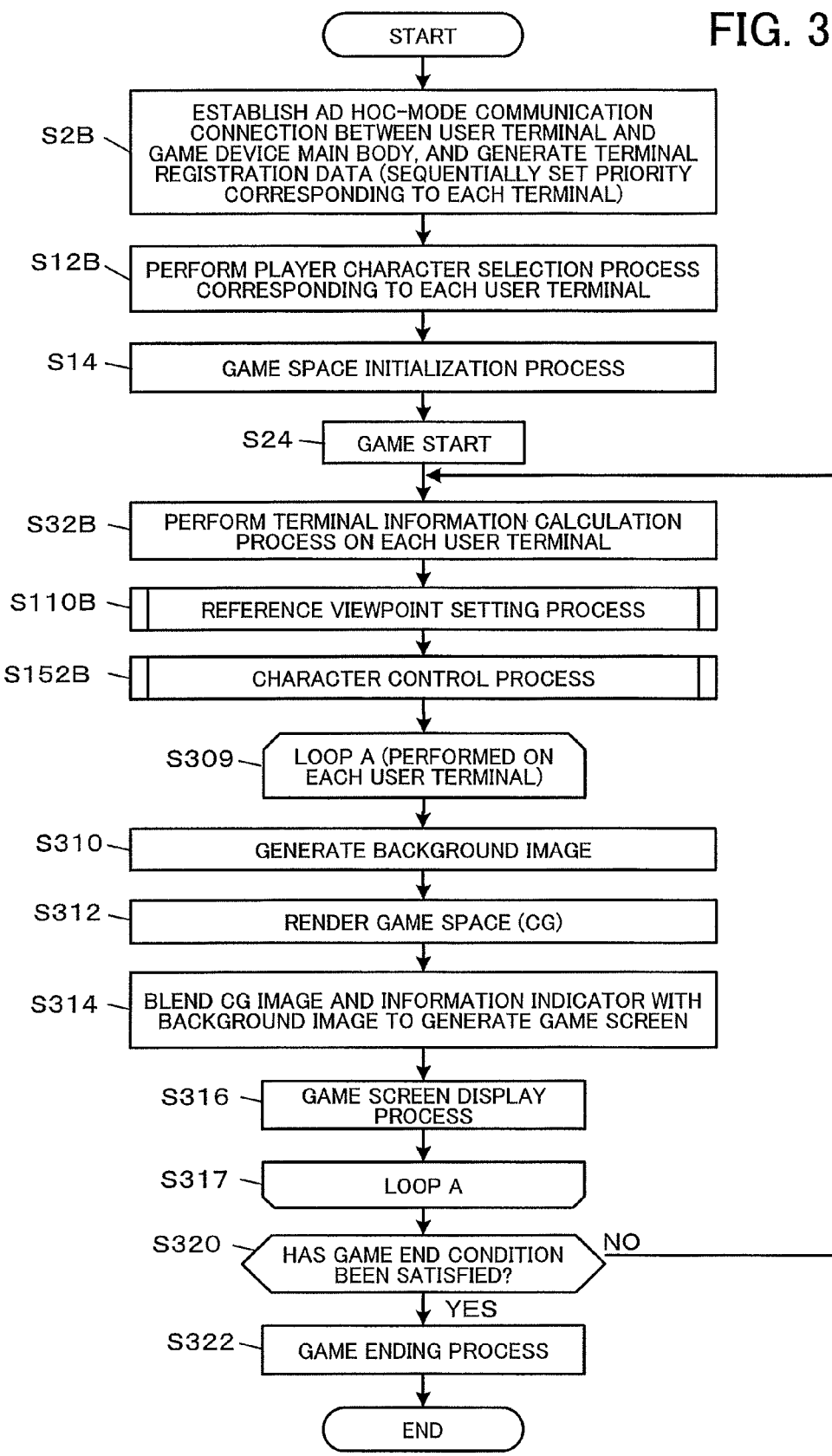
FIG. 30 is a flowchart illustrating the flow of the main process according to the second embodiment.

FIG. 30 is a flowchart illustrating the flow of the main process according to the second embodiment. The main process according to the second embodiment is basically the same as the main process according to the first embodiment, but differs from the main process according to the first embodiment in that the steps relating to the guest device are omitted since the user terminal is not classified into the host device and the guest device. Each user terminal 1590 is equally handled as an independent user terminal.

The details of the differences are described below.

In a step S2B that is provided instead of the step S2 described above in connection with the first embodiment, the processing section 200 establishes communication connection with the user terminal 1590, and generates terminal registration data 520B. In this case, the reference viewpoint priority 523B is set in the same manner as the host priority 523 (step S10) described above in connection with the first embodiment.

In a step S12B that is provided instead of the step S4 described above in connection with the first embodiment, the processing section 200 performs a player character selection process corresponding to each user terminal 1590, and stores the selection result as the player character type 524 included in the terminal registration data 520B.

The processing section 200 initializes the game space (step S14). When the game has started (step S24), the processing section 200 performs a terminal information calculation process on each user terminal 1590 instead of the information calculation process described above in connection with the first embodiment (step S32B).

Figure 31:
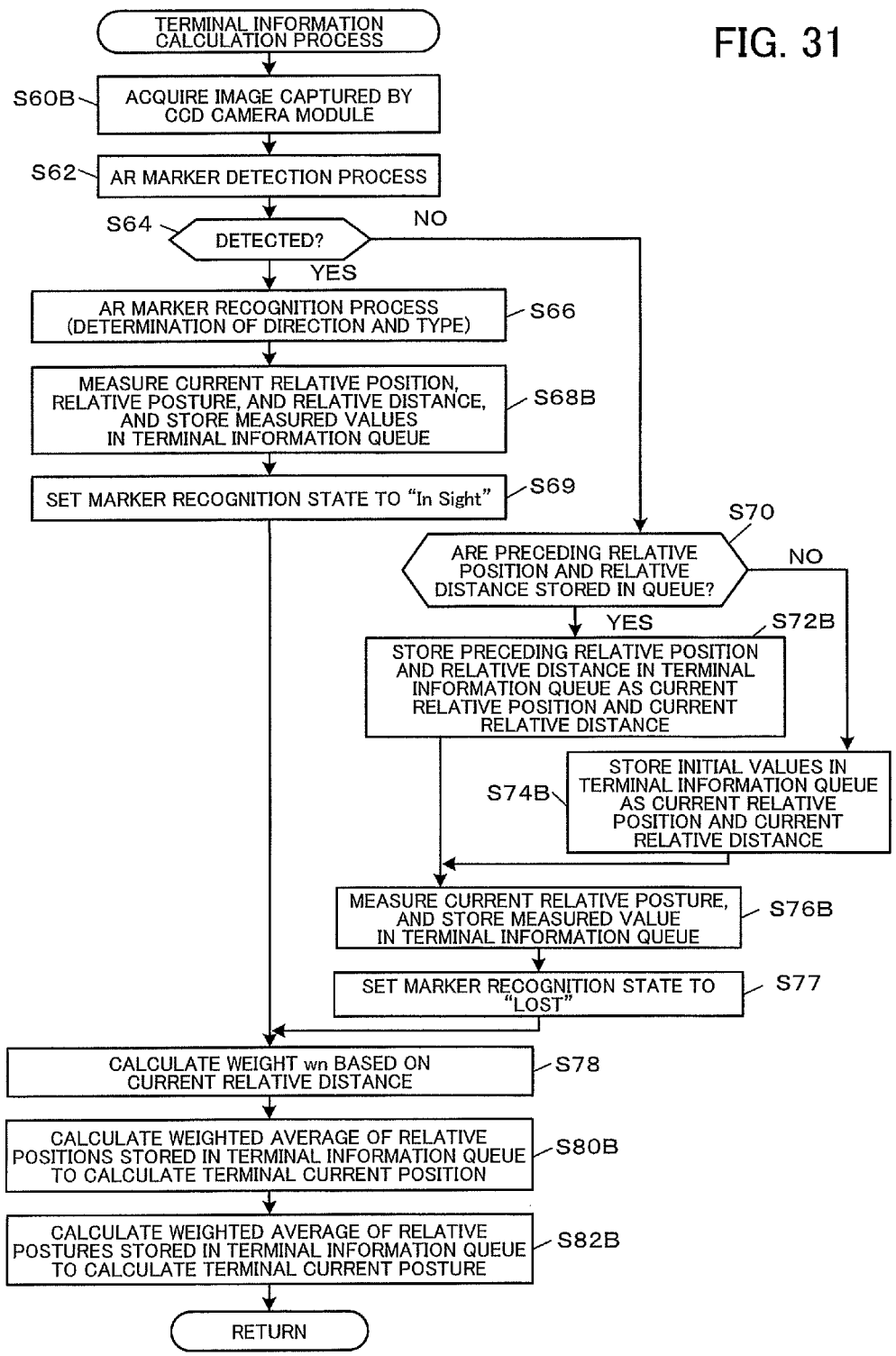
FIG. 31 is a flowchart illustrating the flow of a terminal information calculation process.

As illustrated in FIG. 31, the terminal information calculation process is basically the same as the information calculation process described above in connection with the first embodiment, except for the following points. In a step S60B that is provided instead of the step S60 described above in connection with the first embodiment, the image data captured by the CCD camera module 1516 of the target user terminal 1590 is acquired.

When the AR marker 10 has been detected, the marker recognition state 525 of the user terminal is set to "In Sight" (step S69). When the AR marker 10 has not been detected, the marker recognition state 525 of the user terminal is set to "LOST" (step S77).

Steps S68B, S72B, S74B, S76B, S80B, and S82B are performed in the same manner as described above, except that the game device is replaced with the user terminal, and the information queue is replaced with the terminal information queue.

Again referring to FIG. 30, a reference viewpoint setting process is performed instead of the step S110 (host device setting process) described above in connection with the first embodiment (step S110B).

Figure 32:
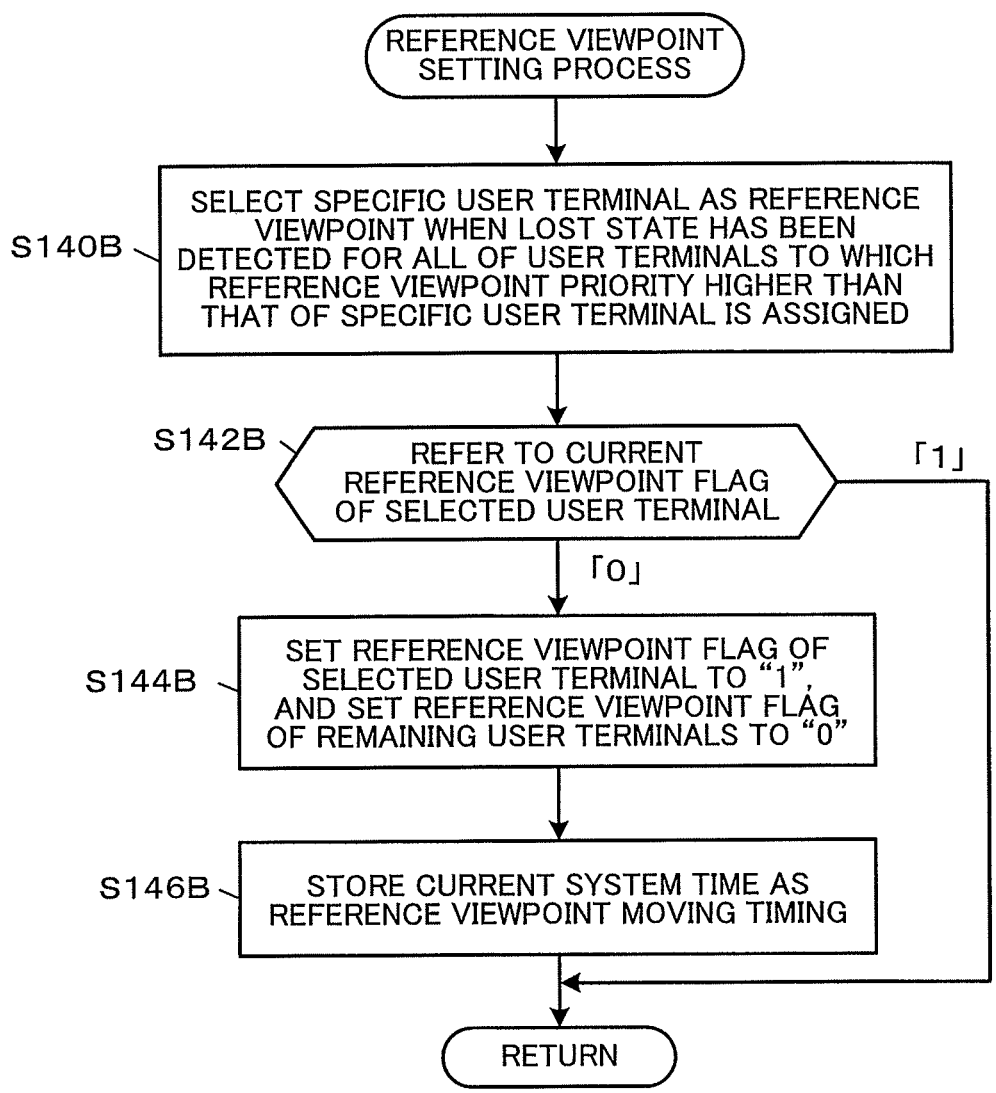
FIG. 32 is a flowchart illustrating the flow of a reference viewpoint setting process.

FIG. 32 is a flowchart illustrating the flow of the reference viewpoint setting process. The reference viewpoint setting process is basically the same as the host device setting process described above in connection with the first embodiment, except that the marker recognition state monitor step is omitted. Steps S140B, S142B, and S144B are performed in the same manner as described above, except that the game device and the other game device are replaced with the user terminal, and a step S146B is performed in the same manner as described above, except that the host function succession timing is replaced with the reference viewpoint switch timing.

Again referring to FIG. 30, the steps S150 and S300 to S304 described above in connection with the first embodiment are omitted, and a character control process is performed instead of the step S152 (host function execution process) described above in connection with the first embodiment (step S152B).

Figure 33:
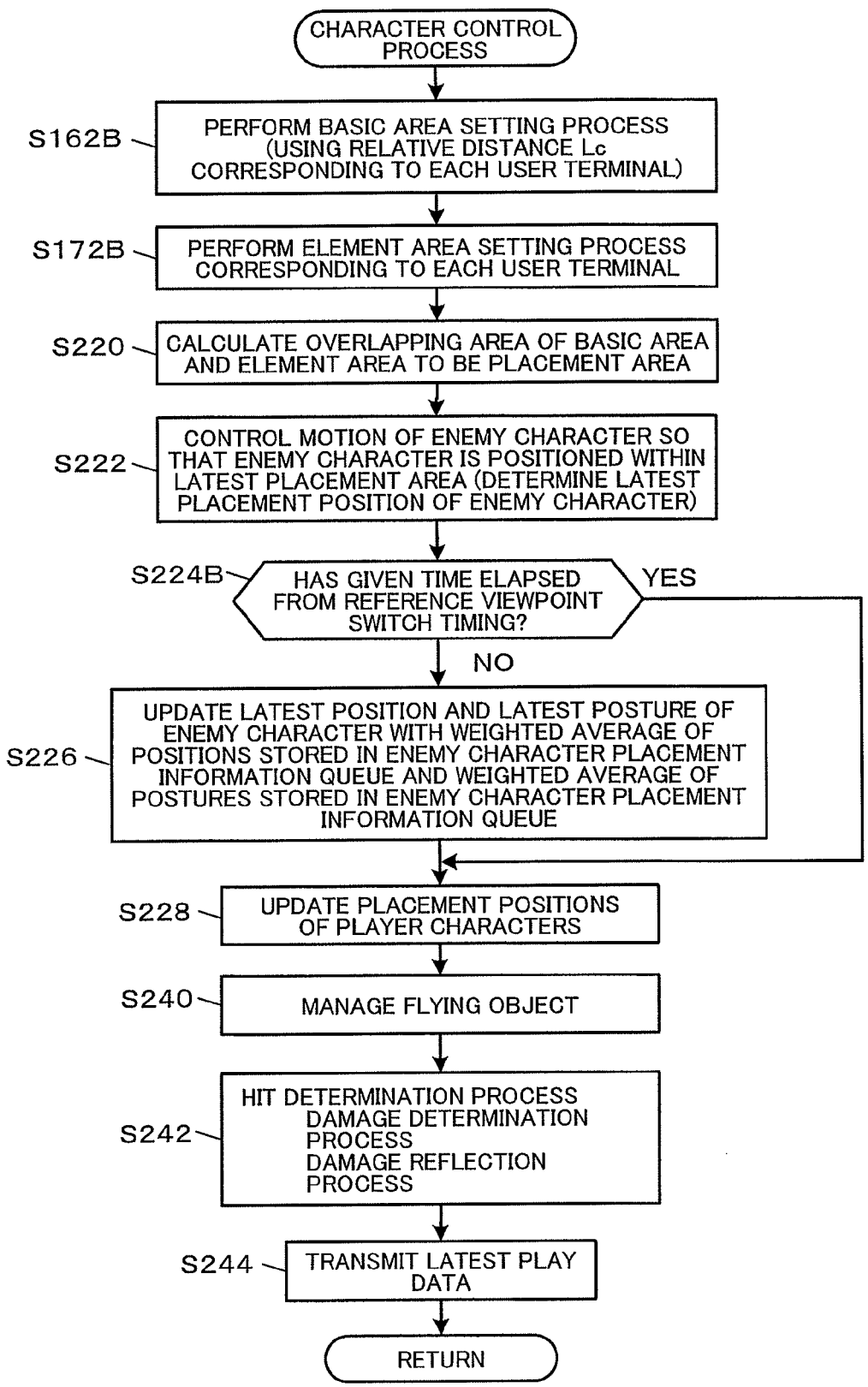
FIG. 33 is a flowchart illustrating the flow of a character control process.

FIG. 33 is a flowchart illustrating the flow of the character control process. The flow of the character control process is basically the same as that of the host function execution process described above in connection with the first embodiment, except for the following points.

The step S160 described above in connection with the first embodiment is omitted, and a basic area setting process is performed (step S162B). The basic area setting process according to the second embodiment differs from the basic area setting process described above in connection with the first embodiment in that the relative distance Lc of each user terminal 1590 is calculated instead of the relative distance Lc of each game-participating device (see FIG. 22). The element area setting process is performed on each user terminal 1590 after the basic area setting process (step S172B).

An overlapping area of the basic area 13 and the element area 14 is calculated to set the placement area 12, and the motion of the enemy character 7 is controlled (steps S220 and S222). In a step S224B that is provided instead of the step S224 described above in connection with the first embodiment, the processing section 200 refers to the reference viewpoint switch timing 562B, and determines whether or not a given time has elapsed from the switch timing.

Again referring to FIG. 30, the processing section 200 performs a loop A process on each user terminal 1590 to perform a game screen generation/display process corresponding to each user terminal 1590 (steps S309 to S317).

Note that the second embodiment need not necessarily be implemented using the single game device 1500B. For example, the second embodiment may be implemented using a smartphone or a portable game device (corresponding to the user terminal 1590) and a given server (corresponding to the game device main body 1501) that are connected through the Internet Modifications The embodiments to which the invention is applied have been described above. Note that the invention is not limited thereto. Various modifications may be appropriately made of the above embodiments, such as appropriately adding other elements, omitting some of the elements, or changing some of the elements.

Although the first embodiment has been described above taking an example in which a computer is used as the game device 1500, an arbitrary electronic device such as a portable game device, a smartphone, a personal computer, or a mobile phone may be used as the game device or the user terminal as long as the electronic device includes an image sensor that serves as the viewpoint of the player, and a gyroscope or an acceleration sensor that detects a change in posture, and can execute a game program.

The game is not limited to a shooting game, but may be an arbitrary game.

The image display section 360 of the game device or the user terminal may be implemented by a display device that allows naked-eye stereovision (e.g., parallax barrier display device or lenticular display device), and a stereoscopic image may be displayed corresponding to the relative position/relative posture of the game device or the user terminal with respect to the AR marker 10. In this case, the live view image captured by the CCD camera module 1516 may be set to be the background, and the character or the like (object) disposed in the coordinate system of the game space (virtual three-dimensional space) may be displayed three-dimensionally. According to the above configuration, when the game device or the user terminal is moved to wrap around the AR marker 10, the object (e.g., enemy character) that appears with respect to the AR marker 10 can be viewed stereoscopically (i.e., a certain depth can be obtained).

In the first embodiment, the posture detected by the posture detection section 108 of the game device 1500 may be exchanged between the game devices 1500, and the posture of the character corresponding to each game device 1500 may be changed corresponding to the posture of each game device 1500. In the second embodiment, the game device main body 1501 may receive the posture detected by the posture detection section 108 of the user terminal 1590, and the posture of the character corresponding to each user terminal 1590 may be changed corresponding to the posture of each user terminal 1590.

REFERENCE SIGNS LIST

10 AR marker
12 Placement area
13 Basic area
14 Element area
104 Imaging section
108 Posture detection section
110 Acceleration detection section
200 Processing section
202 Game calculation section
204 Game participation management control section
205 Host priority setting section
206 Information calculation section
206B Positional relationship calculation section
207 Relative position calculation section
208 Position change suppression control section
209 Current position determination section
210 Relative posture calculation section
211 Current posture determination section
212 Weight setting section
220 Information transmission control section
221 Information reception control section
222 Recognition state determination section
223 LOST signal transmission control section
224 Host device determination section
230 Character display control section
231 Area setting section
232 Basic area setting section
233 Element area setting section
234 Placement area setting section
235 NPC control section
236 Start-up special control section
237 Moving direction control section
249 Host function execution control section
500 Storage section
504 Game program
512 AR marker registration data
514 Depth function setting data
520 Game-participating device registration data
523 Host priority setting section
524 Player character type
525 Marker recognition state
526 Host function flag
530 Information queue
533 Relative position
534 Relative posture
535 Relative distance
537 Current position
538 Current posture
541 Play data
544 Enemy character placement information queue
550 Basic area setting data
552 Element area setting data
554 Placement area setting data
560 Virtual three-dimensional space data
562 Host function succession timing
1500 Game device
1506 Touch panel
1516 CCD camera module
1550 Control board
1556 Triaxial gyroscope
1557 Triaxial acceleration sensor
CM, CM1 to CM3 Virtual camera
Db Depth
PL, PL1 to PL3 Player
PC, PC1 to PC2 Player character
AL1 to AL4 Optical axis

The invention claimed is:
1. A method for a computer that includes an imaging section, a display section, and a communication section to communicate with another computer that includes another imaging section, another display section, and another communication section to communicate with the computer, and implement a multi-player game in an augmented reality space, the method comprising:
displaying a character within a live view image displayed on the display section when a marker has been captured by the imaging section, the character being blended with the live view image;
calculating position information about the computer using a captured image of the marker, the position information about the computer including at least information that indicates a position of the computer with respect to the marker;
receiving information about the other computer, the information about the other computer including position information about the other computer, the position information about the other computer including at least information that indicates a position of the other computer with respect to the marker; and
controlling a display position of the character in the augmented reality space by setting an area within the augmented reality space in which the character is displayed using, at least:
(i) the position information about the computer,
(ii) the information about the other computer, and
(iii) an imaging range of the computer and an imaging range of the other computer.

2. The method as defined in claim 1,
the position information about the computer including information that indicates a distance of the computer with respect to the marker,
the position information about the other computer including information that indicates a distance of the other computer with respect to the marker, and
the calculating of the position information about the computer including calculating the information that indicates the distance of the computer with respect to the marker using the captured image of the marker.

3. The method as defined in claim 1,
the marker having a predetermined shape, and indicating a reference direction,
the position information about the computer including information about a relative positional relationship of the computer with respect to the marker,
the position information about the other computer including information about a relative positional relationship of the other computer with respect to the marker, and
the calculating of the position information about the computer including calculating the information about the relative positional relationship of the computer with respect to the marker using the reference direction indicated by the marker within the captured image of the marker.

4. The method as defined in claim 1,
the controlling of the display position of the character including displaying the character within the area.

5. The method as defined in claim 4,
the imaging range of the computer being an imaging range when capturing the marker based on the position information about the computer, and the imaging range of the other computer being an imaging range when capturing the marker based on the position information about the other computer.

6. The method as defined in claim 5,
the setting of the area including setting the area so as to include at least an overlapping area of the imaging range of the computer and the imaging range of the other computer.

7. The method as defined in claim 5,
the setting of the area including setting the area using a range in which an imaging direction can be changed within an imaging range of the marker as the imaging range of the computer based on the information about the computer, and using a range in which the imaging direction can be changed within the imaging range of the marker as the imaging range of the other computer based on the position information about the other computer.

8. The method as defined in claim 5,
the marker having a planar shape, and
the setting of the area including changing a depth of the imaging range of the computer using a depression angle formed by the computer and the marker.

9. A method for a computer that includes an imaging section, a display section, and a communication section to communicate with another computer, and implement a multi-player game in an augmented reality space, the method comprising:
displaying a character within a live view image displayed on the display section when a marker has been captured by the imaging section, the character being blended with the live view image;
calculating position information about the computer using a captured image of the marker, the position information about the computer including at least information that indicates a position of the computer with respect to the marker;
receiving information about the other computer, the information about the other computer including position information about the other computer, the position information about the other computer including at least information that indicates a position of the other computer with respect to the marker;
controlling a display position of the character in the augmented reality space using:
(i) the position information about the computer, and
(ii) the information about the other computer; and
setting an area within the augmented reality space in which the character is displayed using the position information about the computer and the information about the other computer,
the controlling of the display position of the character including displaying the character within the area, and
the setting of the area including calculating a distance from the marker to the computer and a distance from the marker to the other computer, and setting a size of the area based on the distance from the marker to the computer and the distance from the marker to the other computer.

10. A method for a computer that includes an imaging section, a display section, and a communication section to communicate with another computer, and implement a multi-player game in an augmented reality space, the method comprising:
displaying a character within a live view image displayed on the display section when a marker has been captured by the imaging section, the character being blended with the live view image;
calculating position information about the computer using a captured image of the marker, the position information about the computer including at least information that indicates a position of the computer with respect to the marker;
receiving information about the other computer, the information about the other computer including position information about the other computer, the position information about the other computer including at least information that indicates a position of the other computer with respect to the marker;
controlling a display position of the character in the augmented reality space using:
(i) the position information about the computer, and
(ii) the information about the other computer; and
setting an area within the augmented reality space in which the character is displayed using the position information about the computer and the information about the other computer,
the controlling of the display position of the character including displaying the character within the area,
a plurality of types of the markers being provided,
wherein the setting of the area including:
setting a shape of the area based on the type of the marker captured by the imaging section; and
calculating a distance from the marker to the computer and a distance from the marker to the other computer, and setting a size of the area based on the distance from the marker to the computer and the distance from the marker to the other computer.

11. A method for a computer that includes an imaging section, a display section, and a communication section to communicate with another computer, and implement a multi-player game in an augmented reality space, the method comprising:

displaying a character within a live view image displayed on the display section when a marker has been captured by the imaging section, the character being blended with the live view image;

calculating position information about the computer using a captured image of the marker, the position information about the computer including at least information that indicates a position of the computer with respect to the marker;

receiving information about the other computer, the information about the other computer including position information about the other computer, the position information about the other computer including at least information that indicates a position of the other computer with respect to the marker; and controlling a display position of the character in the augmented reality space using the position information about the computer and the information about the other computer, the computer including a posture detection section that detects a posture of the computer, the information about the other computer including information about a posture detected by the posture detection section included in the other computer, and the method further including controlling a display posture of the character using posture information about the computer that has been detected by the posture detection section, and posture information about the other computer that is included in the information about the other computer.

12. A non-transitory storage medium storing a program for a computer to cause a plurality of user terminals to implement a multi-player game, the computer being able to communicating with each of the plurality of user terminals, and each of the plurality of user terminals including an imaging section and a display section, the multi-player game being a game that is implemented in an augmented reality space, and configured so that a character is displayed within a live view image displayed on the display section when a marker has been captured by the imaging section, the character being blended with the live view image, the program causing the computer to:

calculate a positional relationship of each of the plurality of user terminals with respect to the marker using a captured image of the marker captured by each of the plurality of user terminals; and control a display position of the character in the augmented reality space by setting an area within the augmented reality space in which the character is displayed using, at least: (i) the positional relationship of each of the plurality of user terminals and (ii) an imaging range of each of the plurality of user terminals.

13. A non-transitory storage medium storing a program for a computer to cause a plurality of user terminals to implement a multi-player game, the computer being able to communicating with each of the plurality of user terminals, and each of the plurality of user terminals including an imaging section and a display section, the multi-player game being a game that is implemented in an augmented reality space, and configured so that a character is displayed within a live view image displayed on the display section when a marker has been captured by the imaging section, the character being blended with the live view image, the program causing the computer to:

calculate a positional relationship of each of the plurality of user terminals with respect to the marker using a captured image of the marker captured by each of the plurality of user terminals; and control a display position of the character in the augmented reality space using the positional relationship of each of the plurality of user terminals, wherein:

each of the plurality of user terminals including a posture detection section that detects a posture of each of the plurality of user terminals, and the program further causing the computer to:

receive information about the posture detected by the posture detection section from each of the plurality of user terminals; and control a display posture of the character using the information about the posture.

14. A game device that includes an imaging section, a display section, and a communication section, and communicates with another game device to implement a multi-player game in an augmented reality space, the game device comprising:

a blend/display control section that displays a character within a live view image displayed on the display section when a marker has been captured by the imaging section, the character being blended with the live view image;

a position information calculation section that calculates position information about the game device using a captured image of the marker, the position information about the game device including at least information that indicates a position of the game device with respect to the marker;

an information reception section that receives information about the other game device, the information about the other game device including position information about the other game device, the position information about the other game device including at least information that indicates a position of the other game device with respect to the marker; and a character display control section that controls a display position of the character in the augmented reality space by setting an area within the augmented reality space in which the character is displayed using, at least: (i) the position information about the game device, (ii) the information about the other game device, and (iii) information about an imaging range of the game device and information about an imaging range of the other game device.

15. A computer that causes a plurality of user terminals to implement a multi-player game, the computer being able to communicate with each of the plurality of user terminals, and each of the plurality of user terminals including an imaging section and a display section, the multi-player game being a game that is implemented in an augmented reality space, and configured so that a character is displayed within a live view image displayed on the display section when a marker has been captured by the imaging section, the character being blended with the live view image, the computer comprising:

a positional relationship calculation section that calculates a positional relationship of each of the plurality of user terminals with respect to the marker using a captured image of the marker captured by each of the plurality of user terminals; and a character display control section that controls a display position of the character in the augmented reality space by setting an area within the augmented reality space in which the character is displayed using, at least: (i) the positional relationship of each of the plurality of user terminals and (ii) an imaging range of each of the plurality of user terminals.

16. A game device that includes an imaging section, a display section, and a communication section, and communicates with another game device to implement a multi-player game in an augmented reality space, the game device comprising:

a blend/display control section that displays a character within a live view image displayed on the display section when a marker has been captured by the imaging section, the character being blended with the live view image;

a position information calculation section that calculates position information about the game device using a captured image of the marker, the position information about the game device including at least information that indicates a position of the game device with respect to the marker;

an information reception section that receives information about the other game device, the information about the other game device including position information about the other game device, the position information about the other game device including at least information that indicates a position of the other game device with respect to the marker, and a character display control section that controls a display position of the character in the augmented reality space using the position information about the game device and the information about the other game device, the game device including a posture detection section that detects a posture of the fame device, the information about the other game device including information about a posture detected by the posture detection section included in the other game device, and the blend/display control section controls a display posture of the character using posture information about the game device that has been detected by the posture detection section, and posture information about the other game device that is included in the information about the other game device.

17. A computer that causes a plurality of user terminals to implement a multi-player game, the computer being able to communicate with another computer and each of the plurality of user terminals, and each of the plurality of user terminals including an imaging section and a display section, the multi-player game being a game that is implemented in an augmented reality space, and configured so that a character is displayed within a live view image displayed on the display section when a marker has been captured by the imaging section, the character being blended with the live view image, the computer comprising:

a positional relationship calculation section that calculates a positional relationship of each of the plurality of user terminals with respect to the marker using a captured image of the marker captured by each of the plurality of user terminals; and a character display control section that controls a display position of the character in the augmented reality space using the positional relationship of each of the plurality of user terminals, wherein:

the computer including a posture detection section that detects a posture of the computer, information about the other computer including information about a posture detected by a posture detection section included in the other computer, and the character display control section controls a display posture of the character using posture information about the computer that has been detected by the posture detection section of the computer, and posture information about the other computer that is included in the information about the other computer.

* * * * *